United States Patent
Conley et al.

(10) Patent No.: US 11,440,853 B2
(45) Date of Patent: Sep. 13, 2022

(54) SYSTEMS, METHODS, AND APPARATUS FOR INCREASED WASTEWATER EFFLUENT AND BIOSOLIDS QUALITY

(71) Applicant: Drylet, Inc., Houston, TX (US)

(72) Inventors: M. Scott Conley, Cypress, TX (US); Mark Menendez, Houston, TX (US)

(73) Assignee: DRYLET, INC., Houston, TX (US)

( * ) Notice: Subject to any disclaimer, the term of this patent is extended or adjusted under 35 U.S.C. 154(b) by 0 days.

(21) Appl. No.: 16/489,310

(22) PCT Filed: Feb. 27, 2018

(86) PCT No.: PCT/US2018/019961
§ 371 (c)(1),
(2) Date: Aug. 27, 2019

(87) PCT Pub. No.: WO2018/160567
PCT Pub. Date: Sep. 7, 2018

(65) Prior Publication Data
US 2020/0002240 A1    Jan. 2, 2020

Related U.S. Application Data

(60) Provisional application No. 62/464,816, filed on Feb. 28, 2017.

(51) Int. Cl.
*C05F 17/00* (2020.01)
*C05F 17/40* (2020.01)
(Continued)

(52) U.S. Cl.
CPC .............. *C05F 7/005* (2013.01); *C02F 1/281* (2013.01); *C02F 3/12* (2013.01); *C02F 3/2806* (2013.01);
(Continued)

(58) Field of Classification Search
None
See application file for complete search history.

(56) References Cited

U.S. PATENT DOCUMENTS 3,644,215 A    2/1972    Muller
3,719,496 A    3/1973    Chen et al.
(Continued)

FOREIGN PATENT DOCUMENTS

CN    1309096 A    8/2001
CN    1569668 A    5/2005
(Continued)

OTHER PUBLICATIONS

Baca et al. Cell-directed assembly of bio-nano interfaces-a new scheme for cell immobilization. Acc. Chem. Res. 40:836-845 (2007).
(Continued)

*Primary Examiner* — Wayne A Langel
(74) *Attorney, Agent, or Firm* — Wilson Sonsini Goodrich & Rosati

(57) ABSTRACT

Methods of delivering microorganisms loaded onto an inorganic porous medium. Methods of treating wastewater to increase effluent and biosolids quality. Methods of reducing ammonia and denitrifying wastewater effluent. Methods of reducing phosphorous concentration in wastewater effluent. Composition of biosolids derived from wastewater treatment. Wastewater treatment assemblage for increasing wastewater effluent and biosolids quality.

20 Claims, 6 Drawing Sheets

(51) Int. Cl.

| | |
|---|---|
| *C05F 17/20* | (2020.01) |
| *C05F 5/00* | (2006.01) |
| *C02F 1/28* | (2006.01) |
| *C02F 3/12* | (2006.01) |
| *C02F 3/28* | (2006.01) |
| *C02F 3/34* | (2006.01) |
| *C05B 17/00* | (2006.01) |
| *C05C 3/00* | (2006.01) |
| *C05F 7/00* | (2006.01) |
| *C02F 3/00* | (2006.01) |
| *C02F 101/10* | (2006.01) |
| *C02F 101/16* | (2006.01) |
| *C02F 101/30* | (2006.01) |

(52) U.S. Cl.
CPC .............. *C02F 3/348* (2013.01); *C05B 17/00* (2013.01); *C05C 3/00* (2013.01); *C05F 5/004* (2013.01); *C05F 17/20* (2020.01); *C05F 17/40* (2020.01); *C02F 2003/001* (2013.01); *C02F 2101/105* (2013.01); *C02F 2101/16* (2013.01); *C02F 2101/30* (2013.01)

(56) References Cited

U.S. PATENT DOCUMENTS

| | | | |
|---|---|---|---|
| 3,726,693 | A | 4/1973 | Harris |
| 3,871,957 | A | 3/1975 | Mohan et al. |
| 3,882,253 | A | 5/1975 | Schafer et al. |
| 3,895,219 | A | 7/1975 | Richerson et al. |
| 4,304,857 | A | 12/1981 | Brouillard et al. |
| 4,426,570 | A | 1/1984 | Hikino et al. |
| 4,434,231 | A | 2/1984 | Jung |
| 4,486,651 | A | 12/1984 | Atsumi et al. |
| 4,590,685 | A | 5/1986 | Roth |
| 4,591,455 | A | 5/1986 | Macedo et al. |
| 4,647,464 | A | 3/1987 | Todd, Jr. et al. |
| 4,717,561 | A | 1/1988 | Krivak et al. |
| 4,746,513 | A | 5/1988 | Smith |
| 4,965,434 | A | 10/1990 | Nomura et al. |
| 4,971,820 | A | 11/1990 | Likuski et al. |
| 5,035,804 | A | 7/1991 | Stowe |
| 5,077,461 | A | 12/1991 | Hasegawa |
| 5,151,363 | A | 9/1992 | Payne |
| 5,194,279 | A | 3/1993 | Okel |
| 5,395,808 | A | 3/1995 | Miller et al. |
| 5,403,799 | A | 4/1995 | Miller et al. |
| 5,443,845 | A | 8/1995 | Felix |
| 5,552,176 | A | 9/1996 | Marino |
| 5,569,634 | A | 10/1996 | Miller et al. |
| 5,635,214 | A | 6/1997 | Ponchon et al. |
| 5,678,238 | A | 10/1997 | Billings et al. |
| 5,906,843 | A | 5/1999 | Dew et al. |
| 6,001,322 | A | 12/1999 | Chevallier et al. |
| 6,039,874 | A | 3/2000 | Teran et al. |
| 6,184,408 | B1 | 2/2001 | Burns et al. |
| 6,838,004 | B1 | 1/2005 | Yang et al. |
| 6,991,802 | B1 | 1/2006 | Ahola et al. |
| 7,067,062 | B2 | 6/2006 | Yang et al. |
| 7,153,521 | B2 | 12/2006 | Viot |
| 7,422,737 | B1 | 9/2008 | Nussinovitch et al. |
| 7,538,067 | B2 | 5/2009 | Hu et al. |
| 8,409,822 | B2 | 4/2013 | Trevino et al. |
| 9,296,989 | B2 | 3/2016 | Trevino et al. |
| 10,047,339 | B2 | 8/2018 | Trevino et al. |
| 10,316,312 | B2 | 6/2019 | Trevino et al. |
| 2003/0026845 | A1 | 2/2003 | Etzel et al. |
| 2003/0091641 | A1 | 5/2003 | Tiller et al. |
| 2004/0146444 | A1 | 7/2004 | Dokter et al. |
| 2005/0014237 | A1 | 1/2005 | Lee et al. |
| 2005/0145552 | A1 | 7/2005 | Sheets et al. |
| 2005/0266069 | A1 | 12/2005 | Simmons et al. |
| 2006/0019016 | A1 | 1/2006 | Torcatis |
| 2006/0147546 | A1 | 7/2006 | Ferlin et al. |
| 2007/0017195 | A1 | 1/2007 | Withiam et al. |
| 2007/0042184 | A1 | 2/2007 | Coyne et al. |
| 2007/0281063 | A1 | 12/2007 | Carapelli |
| 2008/0071129 | A1 | 3/2008 | Yang et al. |
| 2009/0065435 | A1 | 3/2009 | Li et al. |
| 2009/0114569 | A1 | 5/2009 | Osaheni et al. |
| 2009/0120872 | A1 | 5/2009 | Kroh |
| 2009/0211453 | A1 | 8/2009 | Nassivera et al. |
| 2009/0214701 | A1 | 8/2009 | Forchhammer et al. |
| 2009/0232950 | A1 | 9/2009 | Brothers, Jr. et al. |
| 2012/0118035 | A1* | 5/2012 | Zhao ............... B01J 19/0066 422/630 |
| 2013/0288326 | A1* | 10/2013 | Pullammanappallil ............... C12M 21/04 435/167 |
| 2014/0120601 | A1* | 5/2014 | Bywater-Ekegard .... C12N 1/14 435/252.5 |
| 2014/0352376 | A1* | 12/2014 | Carpenter ............... C05G 5/30 71/6 |
| 2015/0096343 | A1* | 4/2015 | Pieper ..................... C02F 1/34 71/12 |
| 2015/0259260 | A1* | 9/2015 | Banerjee ............... A01N 63/10 504/358 |
| 2015/0353435 | A1* | 12/2015 | Merrell .................. C05F 7/00 422/291 |
| 2016/0167993 | A1 | 6/2016 | Razavi-Shirazi et al. |
| 2016/0207808 | A1* | 7/2016 | Castellanos Roldán .. C02F 1/32 |
| 2016/0272523 | A1 | 9/2016 | Irie |
| 2016/0355443 | A1* | 12/2016 | Burnham ............... C05D 1/005 |
| 2019/0316070 | A1 | 10/2019 | Conley et al. |

FOREIGN PATENT DOCUMENTS

| | | |
|---|---|---|
| CN | 1884128 A | 12/2006 |
| CN | 101941775 A | 1/2011 |
| CN | 102285739 A | 12/2011 |
| CN | 102464403 A | 5/2012 |
| CN | 102583781 A | 7/2012 |
| CN | 102626606 A | 8/2012 |
| CN | 103274571 A | 9/2013 |
| CN | 104211168 A | 12/2014 |
| CN | 104710087 A | 6/2015 |
| CN | 105084536 A | 11/2015 |
| CN | 105936901 A | 9/2016 |
| CN | 106146076 A | 11/2016 |
| CN | 106390735 A | 2/2017 |
| EP | 0067459 A1 | 12/1982 |
| EP | 1048697 A2 | 11/2000 |
| EP | 1160317 A1 | 12/2001 |
| EP | 1816105 A1 | 8/2007 |
| FR | 2573772 A1 | 5/1986 |
| GB | 736919 A | 9/1955 |
| GB | 886533 A | 1/1962 |
| GB | 938381 A | 10/1963 |
| GB | 1253271 A | 11/1971 |
| GB | 1262838 A | 2/1972 |
| GB | 1412590 A | 11/1975 |
| JP | 2013082569 A | 5/2013 |
| KR | 19990084124 A | 12/1999 |
| KR | 20040085061 A | 10/2004 |
| KR | 20070022872 A | 2/2007 |
| RU | 2378060 C2 | 1/2010 |
| WO | WO-8303102 A1 | 9/1983 |
| WO | WO-9712965 A1 | 4/1997 |
| WO | WO-9812491 A1 | 3/1998 |
| WO | WO-9910472 A1 | 3/1999 |
| WO | WO-2007089144 A1 | 8/2007 |
| WO | WO-2007139264 A1 | 12/2007 |
| WO | WO-2008061363 A1 | 5/2008 |
| WO | WO-2008121078 A1 | 10/2008 |
| WO | WO-2008147296 A1 | 12/2008 |
| WO | WO-2009029312 A1 | 3/2009 |
| WO | WO-2009045023 A2 | 4/2009 |
| WO | WO-2010054439 A1 | 5/2010 |
| WO | WO-2010094747 A1 | 8/2010 |
| WO | WO-2010108211 A1 | 9/2010 |
| WO | WO-2010122545 A1 | 10/2010 |
| WO | WO-2011044145 A1 | 4/2011 |

(56) References Cited

FOREIGN PATENT DOCUMENTS

| | | |
|---|---|---|
| WO | WO-2011087202 A1 | 7/2011 |
| WO | WO-2012138656 A1 | 10/2012 |
| WO | WO-2012161726 A1 | 11/2012 |
| WO | WO-2013188858 A2 | 12/2013 |
| WO | WO-2017040865 A1 | 3/2017 |
| WO | WO-2018160567 A1 | 9/2018 |

OTHER PUBLICATIONS

Coiffier et al. Sol-gel encapsulation of bacteria: a comparison between alkoxide and aqueous routes. J Mater Chem 11L2039-2044 (2001).

Curry et al. Comparative Study of Sand Porosity and a Technique for Determining Porosity of Undisturbed Marine Sediment. Marine Georesources & Geotechnology 22(4)231-252 (2004).

Drake et al. Macropore Size Distribution in Some Typical Porous Substances. Industrial and Engineering Chemistry 17(12)787-791 (1945).

Durham et al. Characterization of Inorganic Biocarriers That Moderate System Upsets during Fixed-Film Biotreatment Processes. Appl Environ Microbiol 60(9):3329-3335 (1994).

Durham et al. New composite biocarriers engineered to contain adsorptive and ion-exchange properties improve immobilized-cell bioreactor process dependability. Appl Environ Microbiol 60(11):4178-4181 (1994).

Feller et al. Polyunsaturated fatty acids in lipid bilayers: intrinsic and environmental contributions to their unique physical properties. JACS 124(2):318-326 (2002).

Harper et al. Cell-Directed Integration into Three-Dimensional Lipid-Silica Nanostructured Matrices. ACSNANO 4(10):5539-5550 (2010).

Heitkamp et al. Evaluation of five biocarriers as supports for immobilized bacteria: Comparative performance during high chemical loading, acid shocking, drying and heat shocking. Environmental Toxicology and Chemistry 12(6):1013-1023 (1993).

Huang et al. Highly efficient cellular labeling of mesoporous nanoparticles in human mesenchymal stem cells: implication for stem cell tracking. The FASEB J. 19:2014-2016 (2005).

Kameda et al. To See a Rock in a Grain of Sand. The Leading Edge 23(8):790-792 (2004).

Liu et al. Porous Nanoparticle Supported Lipid Bilayers (Protocells) as Delivery Vehicles. J Am Chem Soc 131(4):1354-1355 (2009).

Mery et al. Evaluation of natural zeolite as microorganism support medium in nitrifying batch reactors: Influence of zeolite particle size. J Environ Sci Health a Tox Hazard Subst Environ Eng 47(3):420-427 (2012).

Montalvo et al. Application of natural zeolites in anaerobic digestion processes: A review. Applied Clay Science 58:125-133 (2012).

Necasek et al. Drought tolerance of Rhizobium leguminosarum andR. meliloti. Folia Microbiologica 38(4):320-324 (1993).

Nussinovitch et al. Physical characteristics of agar—yeast sponges. Food Hydrocolloids 11(2):231-237 (1997).

PCT/SE97/01532 International Search Report dated Mar. 26, 1998.

PCT/US2010/051499 International Search Report and Written Opinion dated Jan. 28, 2011.

PCT/US2011/054891 International Search Report and Written Opinion dated Oct. 25, 2012.

PCT/US2012/031997 International Search Report and Written Opinion dated Jun. 25, 2012.

PCT/US2016/050013 International Preliminary Report on Patentability dated Mar. 15, 2018.

PCT/US2016/050013 International Search Report and Written Opinion dated Dec. 22, 2016.

PCT/US2017/040974 International Preliminary Report on Patentability dated Jan. 17, 2019.

PCT/US2018/019961 International Preliminary Report on Patentability dated Sep. 12, 2019.

PCT/US2018/019961 International Search Report and Written Opinion dated Jul. 16, 2018.

PCT/US2018/019961 Invitation to Pay Additional Fees dated Apr. 9, 2018.

Tainio Technology & Technique, Inc.; BFMS Biological Farm Management System; Spectrum Extra Soil Amendment; 12102 S. Andrus Rd., Cheney, WA, 99004; Tel. 509.747.5471; www.tainio.com (1 pg.) (no date given).

Teramura et al. Islet-encapsulation in ultra-thin layer-by-layer membranes of poly(vinyl alcohol) anchored to poly(ethylene glycol)-lipids in the cell membrane. Biomaterials 28:4818-4825 (2007).

Torkzaban et al. Transport and Fate of Bacteria in Porous Media: Coupled effects of chemical conditions and pore space geometry. Water Resources Research 44:1-12 (2008).

U.S. Appl. No. 61/390,029, filed Oct. 5, 2010.
U.S. Appl. No. 12/898,435 Office Action dated Jun. 29, 2012.
U.S. Appl. No. 13/253,415 Office Action dated Apr. 4, 2013.
U.S. Appl. No. 13/253,415 Office Action dated Dec. 16, 2013.
U.S. Appl. No. 13/253,415 Office Action dated Jul. 10, 2013.
U.S. Appl. No. 13/253,415 Office Action dated Jul. 3, 2018.
U.S. Appl. No. 13/253,415 Office Action dated May 12, 2014.
U.S. Appl. No. 13/253,415 Office Action Jan. 12, 2018.
U.S. Appl. No. 14/236,387 Office Action dated Aug. 14, 2015.
U.S. Appl. No. 14/236,387 Office Action dated Mar. 3, 2015.
U.S. Appl. No. 15/066,956 Office Action dated Jun. 19, 2017.
U.S. Appl. No. 15/066,956 Office Action dated Nov. 2, 2017.

Wang et al. Biofunctionalized Phospholipid-Capped Mesoporous Silica Nanoshuttles for Targeted Drug Delivery; Improved Water Suspensibility and Decreased Nanospecific Protein Binding. ACS Nano 4(8):4371-4379 (2010).

U.S. Appl. No. 15/756,633 Office Action dated Jul. 28, 2020.
U.S. Appl. No. 15/756,633 Office Action dated Mar. 19, 2021.

Visvanathan et al. Membrane Separation Bioreactors for Wastewater Treatment. Critical Reviews in Environmental Science and Technology 39(1):1-48 (2000).

Walker. A Plain English Guide to the EPA Part 503 Biosolids Rule (Sep. 30, 1994). Retrieved from the Internet: URL:https://www.epa.gov/sites/production/files/2018-12/documents/plain-english-guide-part503-biosolids-rule.pdf [retrieved on Nov. 4, 2020].

U.S. Appl. No. 15/756,633 Office Action dated Nov. 30, 2021.

Wang et al. Biogas production improvement and C/N control by natural clinoptilolite addition into anaerobic co-digestion of Phragmites australis, feces and kitchen waste. Bioresour Technol 180:192-9 (2015).

\* cited by examiner

SYSTEMS, METHODS, AND APPARATUS FOR INCREASED WASTEWATER EFFLUENT AND BIOSOLIDS QUALITY

CROSS REFERENCE TO RELATED APPLICATIONS

This application is the National Phase application of International Patent Application No. PCT/US2018/019961, filed on Feb. 27, 2018, which claims benefit of priority to U.S. Provisional Application No. 62/464,816, filed on Feb. 28, 2017, both of which are incorporated by reference herein in their entirety.

SUMMARY OF THE INVENTION

Disclosed herein, in certain embodiments, are methods of producing a fertilizer or compost comprising: (a) proving a microbial solution comprising at least one microbial species loaded onto an inorganic porous medium; (b) providing a reaction vessel comprising an influent stream, an effluent stream, an aqueous phase, and a biosolids phase and wherein the biosolids phase comprises at least one nutrient source for the at least one microbial species; (c) adding the microbial solution comprising at least one microbial species loaded onto the inorganic porous medium to the reaction vessel and wherein the at least one microbial species consumes a portion of the biosolids phase; (d) separating the effluent stream into a treated aqueous phase and a treated biosolids phase; and (e) dewatering the treated biosolids phase to produce fertilizer or compost. In some embodiments, the inorganic porous medium comprises silica. In some embodiments, the inorganic porous medium comprises zeolite. In some embodiments, the inorganic porous medium comprises silica, zeolite, aluminosilicate, silicate, diatomaceous earth, or any combination thereof. In some embodiments, the at least one microbial species is aerobic. In some embodiments, the at least one microbial species is anaerobic. In some embodiments, the at least one microbial species is facultative.

In some embodiments, the influent stream includes residential wastewater, agricultural wastewater, industrial wastewater, runoff wastewater, or any combination thereof. In some embodiments, adding the microbial solution comprising the at least one microbial species loaded onto the inorganic porous medium to the reaction vessel reduces the quantity of the treated biosolids phase. In some embodiments, adding the microbial solution comprising the at least one microbial species loaded into the inorganic porous medium to the reaction vessel increases the carrying capacity of the reaction vessel. In some embodiments, separating the effluent stream into the treated aqueous phase and the treated biosolids phase includes decantation, filtration, centrifugation, or any combination thereof. In some embodiments, dewatering the treated biosolids phase includes centrifugation or filtration.

In some embodiments, the treated biosolids phase comprises less than about 3 most probable number (MPN) *Salmonella enterica* spp. per 4 grams of solids on a dry basis. In some embodiments, the treated biosolids phase comprises less than about 1000 MPN fecal coliform per gram of total solids on a dry basis. In some embodiments, the treated biosolids phase comprises less than about 1 plaque-forming unit (PFU) of enteric viruses per 4 grams of total solids on a dry basis. In some embodiments, the treated biosolids phase comprises less than about 1 viable helminth ova per 4 grams of total solids on a dry basis with a vector attraction standard oxygen uptake rate of less than about 1.5 milligrams of oxygen per gram of solids per hour. In some embodiments, the treated biosolids phase comprises less than about 41 ppm arsenic, less than about 39 ppm cadmium, less than about 1,200 ppm chromium, less than about 1,500 ppm copper, less than about 300 ppm lead, less than about 17 ppm mercury, less than about 420 ppm nickel, less than about 36 ppm selenium, and less than about 2,800 ppm zinc. In some embodiments, the inorganic porous medium is selected or modified for sorption of nitrogen and/or phosphorous from the aqueous phase to (i) increase a nutrient concentration of the fertilizer of compost and (ii) decrease the amount of nitrogen and/or phosphorous in the aqueous phase. In some embodiments, (i) a solids retention time in the reaction vessel is increased by greater than or equal to about 50% and/or (ii) an amount of the treated biosolids phase is reduced by greater than or equal to about 5% when the solids retention time is maintained constant. In some embodiments, a fertilizer or compost is produced by the method.

Disclosed herein, in certain embodiments, are methods of producing fertilizer or compost from a wastewater treatment plant, the method comprising: (a) providing a microbial solution comprising at least one microbial species loaded onto an inorganic porous medium; (b) providing an aeration basin comprising an influent stream, an effluent stream, an aqueous phase, and a biosolids phase and wherein the biosolids phase comprises at least one nutrient source for the at least one microbial species; (c) adding the microbial solution comprising the at least one microbial species loaded onto the inorganic porous medium to the aeration basin and wherein the at least one microbial species consumes a portion of the biosolids phase; (d) separating the effluent stream into a treated aqueous phase and a treated biosolids phase; (e) returning a quantity of the treated biosolids phase to the aeration basin, wherein the treated biosolids phase is further consumed by the at least one microbial species and wherein the quantity of the treated biosolids phase is reduced; (f) digesting the treated biosolids phase in a digester to yield a digested biosolids phase; and (g) dewatering the digested biosolids phase to produce a fertilizer or compost. In some embodiments, the inorganic porous medium comprises silica. In some embodiments, the inorganic porous medium comprises zeolite. In some embodiments, the inorganic porous medium comprises silica, zeolite, aluminosilicate, silicate, diatomaceous earth, or any combination thereof. In some embodiments, the at least one microbial species is aerobic. In some embodiments, the at least one microbial species is anaerobic. In some embodiments, the at least one microbial species is facultative.

In some embodiments, the influent stream includes residential wastewater, agricultural wastewater, industrial wastewater, runoff wastewater, or any combination thereof. In some embodiments, adding the microbial solution comprising the at least one microbial species loaded onto the inorganic porous medium to the aeration basin reduces the quantity of the treated biosolids phase. In some embodiments, adding the microbial solution comprising the at least one microbial species loaded onto the inorganic porous medium to the aeration basin increases the carrying capacity of the aeration basin. In some embodiments, separating the effluent stream into the treated aqueous phase and the treated biosolids phase includes decantation, filtration, centrifugation, or any combination thereof. In some embodiments, separating the effluent stream into the treated aqueous phase and the treated biosolids phase includes decantation, filtration, centrifugation, or any combination thereof. In some embodiments, dewatering the digested biosolids phase includes centrifugation or filtration.

In some embodiments, the digested biosolids phase comprises less than about 3 most probable number (MPN) *Salmonella enterica* spp. per 4 grams of solids on a dry basis. In some embodiments, the digested biosolids phase comprises less than about 1000 MPN fecal coliform per gram of total solids on a dry basis. In some embodiments, the digested biosolids phase comprises less than about 1 plaque-forming unit (PFU) of enteric viruses per 4 grams of total solids on a dry basis. In some embodiments, the digested biosolids phase comprises less than about 1 viable helminth ova per 4 grams of total solids on a dry basis with a vector attraction standard oxygen uptake rate of less than about 1.5 milligrams of oxygen per gram of solids per hour. In some embodiments, the digested biosolids phase comprises less than about 41 ppm arsenic, less than about 39 ppm cadmium, less than about 1,200 ppm chromium, less than about 1,500 ppm copper, less than about 300 ppm lead, less than about 17 ppm mercury, less than about 420 ppm nickel, less than about 36 ppm selenium, and less than about 2,800 ppm zinc. In some embodiments, the inorganic porous medium is selected or modified for sorption of nitrogen and/or phosphorous from the aqueous phase to (i) increase a nutrient concentration of the fertilizer of compost and (ii) decrease the amount of nitrogen and/or phosphorous in the aqueous phase. In some embodiments, (i) a solids retention time in the reaction vessel is increased by greater than or equal to about 50% and/or (ii) an amount of the treated biosolids phase is reduced by greater than or equal to about 5% when the solids retention time is maintained constant. In some embodiments, a fertilizer or compost is produced by the method. In some embodiments, a wastewater treatment facility implements the method.

Disclosed herein, in certain embodiments, are compositions of solid fertilizer or compost comprising: (i) dewatered biosolids, (ii) at least about 500 ppm of an inorganic porous medium on a dry basis; and wherein the composition is characterized as having at least one of the following five properties: an analytical composition comprising less than about 41 ppm arsenic, less than about 39 ppm cadmium, less than about 1,200 ppm chromium, less than about 1,500 ppm copper, less than about 300 ppm lead, less than about 17 ppm mercury, less than about 420 ppm nickel, less than about 36 ppm selenium, and less than about 2,800 ppm zinc; a concentration of *Salmonella enterica* spp. below about 3 most probable number (MPN) per 4 grams of total solids on a dry basis; a total concentration of fecal coliform bacteria less than about 1000 MPN per gram of total solids on a dry basis; a density of enteric viruses less than about 1 plaque-forming unit (PFU) per 4 grams of total solids on a dry basis; or a density of viable helminth ova less than 1 per 4 grams of total solids on a dry basis with a vector attraction standard oxygen uptake rate of less than 1.5 milligrams of oxygen per gram of solids per hour. In some embodiments, the biosolids are not derived from a wastewater treatment plant. In some embodiments the biosolids are derived from a wastewater treatment plant.

In some embodiments, the inorganic porous medium comprises silica. In some embodiments, the inorganic porous medium comprises zeolite. In some embodiments, the inorganic porous medium comprises silica, zeolite, aluminosilicate, silicate, diatomaceous earth, or any combination thereof. In some embodiments, the enteric viruses include human astroviruses, human adenoviruses, noroviruses, human sapoviruses, human parvoviruses, non-polio enteroviruses, and human rotaviruses. In some embodiments, the composition comprises an analytical composition comprising less than about 41 ppm arsenic, less than about 39 ppm cadmium, less than about 1,200 ppm chromium, less than about 1,500 ppm copper, less than about 300 ppm lead, less than about 17 ppm mercury, less than about 420 ppm nickel, less than about 36 ppm selenium, and less than about 2,800 ppm zinc, a concentration of *Salmonella enterica* spp. below about 3 most probable number (MPN) per 4 grams of total solids on a dry basis, a total concentration of fecal coliform bacteria less than about 1000 MPN per gram of total solids on a dry basis, a density of enteric viruses less than about 1 plaque-forming unit (PFU) per 4 grams of total solids on a dry basis, and a density of viable helminth ova is less than about 1 per 4 grams of total solids on a dry basis with a vector attraction standard oxygen uptake rate of less than 1.5 milligrams of oxygen per gram of solids per hour. In some embodiments, a wastewater treatment facility produces the composition.

Disclosed herein, in certain embodiments, are methods of reducing ammonia and/or denitrifying wastewater comprising: (a) providing a microbial solution comprising at least one microbial species loaded on an inorganic porous medium; (b) providing an aeration basis comprising an influent stream, and effluent stream, an aqueous phase, and wherein the aqueous phase comprises ammonia; and (c) adding the microbial solution comprising the at least one microbial species loaded onto the inorganic porous medium to the aeration basin and wherein the at least one microbial species consumes the ammonia to produce nitrite, nitrate, molecular nitrogen, or any combination thereof and thereby reduces the amount ammonia and/or denitrifies the wastewater. In some embodiments, the inorganic porous medium comprises silica. In some embodiments, the inorganic porous medium comprises zeolite. In some embodiments, the inorganic porous medium comprises silica, zeolite, aluminosilicate, silicate, diatomaceous earth, or any combination thereof.

In some embodiments, the at least one microbial species is aerobic. In some embodiments, the at least one microbial species is anaerobic. In some embodiments, the at least one microbial species is facultative. In some embodiments, reducing ammonia does not require the use of a chlorinator, ozone, peroxide, bleach, or ultra violet light. In some embodiments, the inorganic porous medium is selected or modified for sorption of nitrogen from the aqueous phase to (i) increase a nutrient concentration of a solid phase and (ii) decrease the amount of nitrogen in the aqueous phase. In some embodiments, an effluent is produced using the methods. In some embodiments, a wastewater treatment facility implementing the method.

Disclosed herein, in certain embodiments, are methods of reducing phosphorous in wastewater comprising: (a) providing a microbial solution comprising at least one microbial species loaded onto an inorganic porous medium; (b) providing an aeration basin comprising an influent stream, an effluent stream, and an aqueous phase, and wherein the aqueous phase comprises inorganic and organic aqueous phosphorus; and (c) adding the microbial solution comprising the at least one microbial species loaded onto the inorganic porous medium to the aeration basin and wherein the at least one microbial species consumes the inorganic and organic aqueous phosphorus to reduce the amount of inorganic and organic aqueous phosphorous and prevent eutrophication. In some embodiments, the inorganic porous medium comprises silica. In some embodiments, the inorganic porous medium comprises zeolite. In some embodiments, the inorganic porous medium comprises silica, zeolite, aluminosilicate, silicate, diatomaceous earth, or any combination thereof.

In some embodiments, the at least one microbial species is aerobic. In some embodiments, the at least one microbial species is anaerobic. In some embodiments, the at least one microbial species is facultative. In some embodiments, reducing the amount of inorganic and organic aqueous phosphorous does not require the addition of an iron or alumina compound. In some embodiments, reducing the amount of inorganic and organic aqueous phosphorous does not require the addition of magnesium chloride or magnesium hydroxide. In some embodiments, the inorganic porous medium is selected or modified for sorption of the inorganic and organic aqueous phosphorous from the aqueous phase to (i) increase a nutrient concentration of a solid phase and (ii) decrease the amount of inorganic or organic aqueous phosphorous in the aqueous phase. In some embodiments, an effluent is produced by the methods. In some embodiments, a wastewater treatment facility implements the methods.

Disclosed herein, in certain embodiments, are assemblages for treating wastewater comprising: an influent stream comprising an aqueous phase and a biosolids phase; a reaction vessel comprising at least one inlet stream, at least one outlet stream, and at least one microbial species loaded onto an inorganic porous medium; and a separator comprising at least one inlet stream and at least one outlet stream and wherein the separator separates the aqueous phase from the biosolids phase. In some embodiments, the inorganic porous medium comprises silica. In some embodiments, the inorganic porous medium comprises zeolite. In some embodiments, the inorganic porous medium comprises silica, zeolite, aluminosilicate, silicate, diatomaceous earth, or any combination thereof.

In some embodiments, the at least one microbial species is aerobic. In some embodiments, the at least one microbial species is anaerobic. In some embodiments, the at least one microbial species is facultative. In some embodiments, the assemblage does not comprise a chlorinator. In some embodiments, the assemblage does not comprise an ozonator. In some embodiments, the influent stream includes residential wastewater, agricultural wastewater, industrial wastewater, runoff wastewater, or any combination thereof. In some embodiments, adding the microbial solution comprising the at least one microbial species to the reaction vessel reduces the quantity of the biosolids phase. In some embodiments, the separator comprises a decanter, filter, centrifuge, or combination thereof. In some embodiments, the reaction vessel comprises an aeration basin, lagoon, oxidation ditch, extended aeration, conventional activated sludge, membrane bioreactor, moving bed biofilm reactor, integrated fixed film activated sludge, trickle bed reactor, sequencing batch reactor, complete mix, step feed, modified aeration, contact stabilization, high purity oxygen reactor, Kraus process, or any other reactor for microbial growth. In some embodiments, the reaction vessel is an aeration basin. In some embodiments, a wastewater treatment facility comprises the assemblage.

Disclosed herein, in certain embodiments, are assemblages for treating wastewater comprising: an influent stream comprising an aqueous phase and a biosolids phase; a reaction vessel comprising at least one inlet stream, at least one outlet stream, and at least one microbial species loaded onto an inorganic porous medium; a separator comprising at least one inlet stream and at least one outlet stream and wherein the separator separates the aqueous phase from the biosolids phase; a return activated sludge (RAS) line that carries a portion of the biosolids phase from the separator to the aeration basin; a waste activated sludge (WAS) line that carries a second portion of the biosolids phase to a dewaterer that dewaters the biosolids phase; and an effluent stream that comprises a treated aqueous phase. In some embodiments, the inorganic porous medium comprises silica. In some embodiments, the inorganic porous medium comprises zeolite. In some embodiments, the inorganic porous medium comprises silica, zeolite, aluminosilicate, silicate, diatomaceous earth, or any combination thereof.

In some embodiments, the at least one microbial species is aerobic. In some embodiments, the at least one microbial species is anaerobic. In some embodiments, the at least one microbial species is facultative. In some embodiments, the assemblage does not comprise a chlorinator. In some embodiments, the assemblage does not comprise an ozonator. In some embodiments, the influent stream includes residential wastewater, agricultural wastewater, industrial wastewater, runoff wastewater, or any combination thereof. In some embodiments, adding the microbial solution comprising the at least one microbial species loaded onto an inorganic porous medium to the reaction vessel reduces the quantity of the biosolids phase. In some embodiments, the separator comprises a decanter, filter, centrifuge, or combination thereof. In some embodiments, the reaction vessel comprises an aeration basin, lagoon, oxidation ditch, extended aeration, conventional activated sludge, membrane bioreactor, moving bed biofilm reactor, integrated fixed film activated sludge, trickle bed reactor, sequencing batch reactor, complete mix, step feed, modified aeration, contact stabilization, high purity oxygen reactor, Kraus process, or any other reactor for microbial growth. In some embodiments, the reaction vessel is an aeration basin. In some embodiments, a wastewater treatment facility comprises the assemblage.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
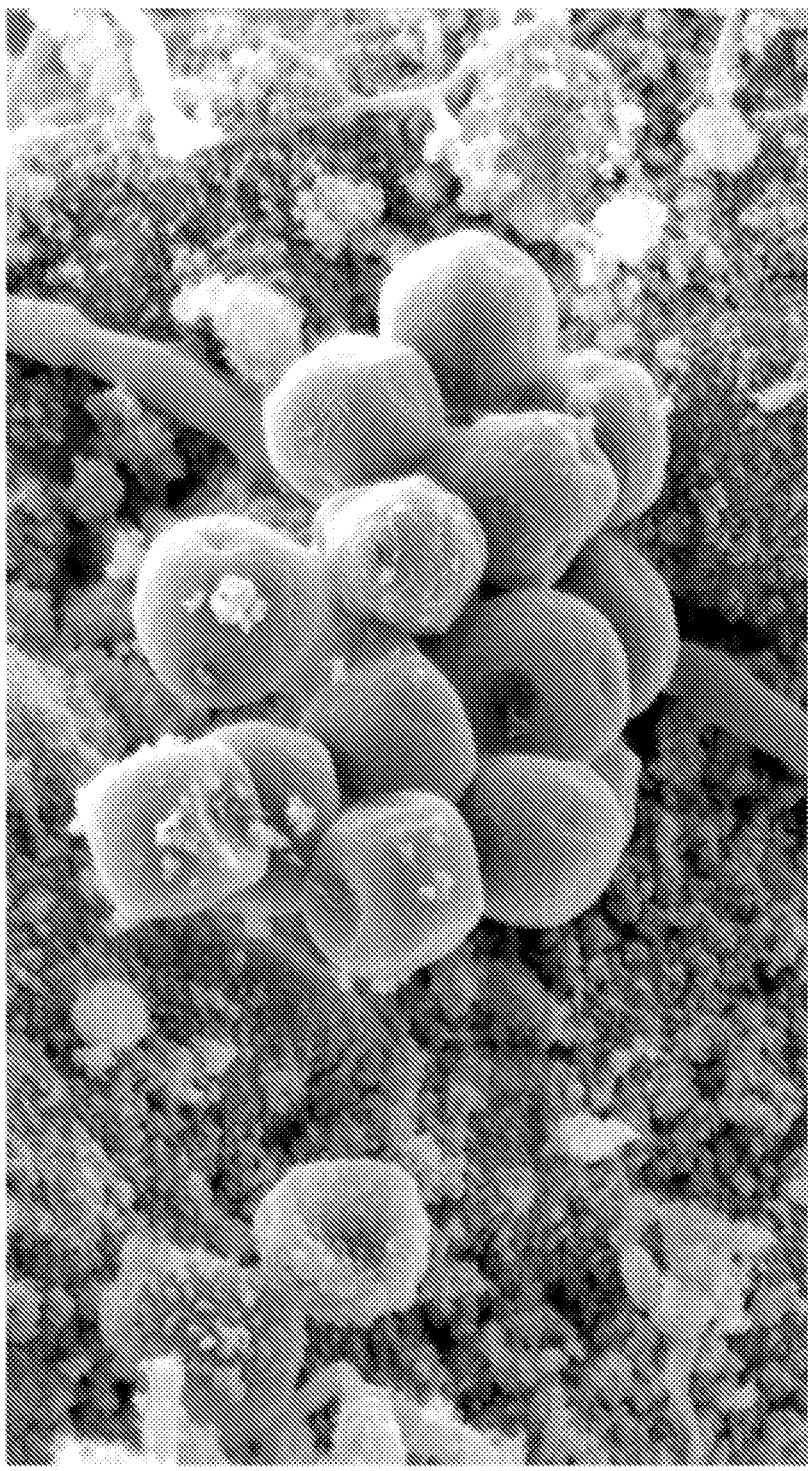
FIG. 1 illustrates microorganisms loaded onto an inorganic porous medium.

Reaction vessels are utilized in a wide range of industrial processes, including but not limited to generation of biofuels, treatment of water, food preparation and processing, and manufacturing of biological products. Industrial reaction vessels are operated in a batch mode, a continuous process mode, or as a hybrid of batch and continuous process mode. For example, in the manufacture of therapeutic biological proteins, batch processing is utilized to obtain stable clinical products at high titers. Continuous bioprocessing is utilized for processes that require, for example, an ongoing evolution of a mixed population of cells that are capable of consuming large amounts of variable feedstock all year around. Continuous bioprocessing is also used in instances where there is production of products that negatively affect cell growth or that are unstable and degrade under batch processing conditions.

Water, land, and energy resource management continue to be pressing challenges. Consequently, process optimization of batch, continuous, and hybrid bioprocessing modes is critical to conserving resources and deriving maximum value from current processes utilizing global resources. Process optimization includes increasing operational efficiency, increasing carrying capacity of reaction vessel systems, and maximizing yields while minimizing consumption of raw materials and costs.

For example, water management involves collection, treatment, and recycling of both clean water and wastewater. Wastewater treatment includes a range of processes such as simple accumulation of wastewater followed by discharge of untreated but screened wastewater streams directly into bodies of water and wastewater treatment plants (WWTP) utilizing sophisticated treatment reaction vessels. The products of the treatment processes are primarily clean effluent and solids in the form of sludge. Biological treatment of wastewater is accomplished by growing microbial species in a continuous reactor mode under aerobic conditions. Wastewater treatment models focus on global growth rates without regard for the relative abundance of individual species present within the reaction vessel because it is difficult to isolate and accurately catalog all species present. Due to the abundance of microbial species present during wastewater treatment, the wastewater treatment industry provides the most commonly encountered example of complex mixed microbial culture interactions.

Process optimizations for wastewater treatment processes include, but are not limited to, reducing the total amount of resulting or produced sludge from the wastewater system that requires disposal or post-treatment after dewatering, increasing the quality of the resultant biosolids, and increasing the effluent quality. Technologies used to reduce sludge in wastewater treatment systems include treating with products containing enzymatic blends, liquid based microbial cultures, or nutrient based microbial cultures. However, these technologies have been unsuccessful in reducing sludge, which consists mostly of water (typically 70% to 85%). Sludge disposal equates to hauling vast quantities of water around the planet every day and utilizes land resources such as energy and fuel. In addition, sludge reduction amounts to significant water conservation as the water content can be returned to the groundwater supply rather than evaporated, contributing to impending water shortages.

Key performance indicators that are commonly used in the WWTP industry include: amount of mixed liquor suspended solids (MLSS), waste activated sludge (WAS), volatile suspended solids (VSS), total suspended solids (TSS), recycle ratio, return activated sludge (RAS), biological oxygen demand (BOD), dissolved oxygen (DO), and sludge blanket height. Key performance indicators in WWTP focus on suspended and settled solids. One such indicator is the solids retention time (SRT). If the SRT is too short, active microorganisms or microorganisms in the log phase may be washed out. If the SRT is too long, multicellular organisms or undesired microorganism become entrenched and adversely affect the system. Key performance indicators from systems that employ various wastewater treatment systems are shown in Table 1. The values shown in the table are from a WWTP operator manual (Division of Compliance Assistance. *Wastewater Treatment Plant Operator Certification Manual*. Frankfort, Ky. Department of Environmental Protection, 2012. Accessed 23 Feb. 2017).

TABLE 1

Design Parameters for Activated Sludge Processes

| Process Modification | SRT (DAYS) | F/M lbs. BOD/lb. MLVSS/ day | Organic Loading (lbs. BOD/ 1000 ft³) | MLSS (mg/L) | Detention Time (hours) | Return Flow to Plant Flow Ratio |
|---|---|---|---|---|---|---|
| Conventional | 5-15 | 0.2-0.5 | 20-40 | 1000-3000 | 4-8 | 0.25-0.75 |
| Complete Mix | 1-15 | 0.2-1.0 | 50-120 | 1000-6500 | 3-5 | 0.25-1.0 |
| Step Feed | 3-15 | 0.2-0.5 | 40-60 | 1500-3500 | 3-5 | 0.25-0.75 |
| Modified Aeration | 0.2-0.5 | 1.5-5.0 | 75-150 | 200-1000 | 1.5-3.0 | 0.05-0.25 |
| Contact Stabilization | 5-15 | 0.2-0.6 | 60-75 | 1000-3000 4000-9000 | 0.5-1.0 3-6 | 0.5-1.5 |
| Extended | 20-30 | 0.05-0.15 | 12.5-15 | 2000-6000 | 18-36 | 0.5-1.5 |
| Oxidation Ditch | 10-30 | 0.05-0.15 | 12.5-15 | 2000-6000 | 18-36 | 0.75-1.5 |
| High Purity Oxygen | 3-10 | 0.25-1.0 | 100-200 | 3000-8000 | 1-3 | 0.25-0.5 |
| Kraus Process | 5-15 | 0.3-0.8 | 40-100 | 2000-3000 | 4-8 | 0.5-1.0 |

Most WWTPs are designed to have a recycle ratio between 50 and 150% of the influent flow rate. The typical range for dissolved oxygen, which is the amount of oxygen that is present in the water, measured in milligrams per liter, and is usually between 2 and 3.5 mg/L in the aeration basin. In most systems, control is achieved by keeping a constant MLSS or a constant solids retention time. The MLSS typically ranges between 2500 and 3500 mg/L. Solids retention time usually ranges between 10 and 20 days. The operator alters the wasting rate, which is a fraction of the clarifier underflow to keep a steady-state population, measured as MLSS in the basins. The operator maintains a constant sludge blanket in the clarifiers by changing the RAS or recycle ratio raising the RAS flow rate as blanket height climbs and lowering RAS flow rate if blankets begin to fall.

Most of the VSS into the WWTP (80-90%) are organic foodstuffs like carbohydrates, lipids, and proteins. A small fraction of the VSS coming into the WWTP is comprised of non-biodegradable VSS (nbVSS). Approximately 10% of the TSS into the WWTP are comprised of inorganic material like metals and silt. Neither the nbVSS nor the inert inorganics are consumed by biological activity. These solids are not the target of activated sludge treatment. The non-biodegradable solids pass through the WWTP with the majority exiting in the generated sludge and a small amount remaining suspended and exiting at the outfall per limits set by the Environmental Protection Agency (EPA). Some fraction, $f_d$, of VSS generated in the WWTP remains as non-biodegradable "cell debris." This cell debris is the major portion of the nbVSS, which along with the inert inorganics comprises sludge and exits the WWTP.

The fraction of total organic carbon (TOC) in VSS that is completely biodegradable ($1-f_d$) leaves as carbon dioxide, where $f_d$ is the non-biodegradable fraction. The process of waste stabilization involves the oxidation of organic material by bacteria with the production of carbon dioxide and water. Thus, about 50% of the inbound BOD is converted to gas ($CO_2$ and $N_2$) and water according to equation below. This is called "burn" or "mass to gas." Consequently, the biomass synthesis yield is typically less than unity.

$$\text{biomass synthesis yield, } Y = \frac{g \text{ biomass produced}}{g \text{ substrate consumed}}$$

In some embodiments, the yield is defined as:

$$Y = \frac{\text{tons of dry solids out}}{\text{tons of BOD in}}$$

Yield varies greatly, but most efficient WWTPs produce around half a ton of sludge for every ton of biodegradable material they receive. Observed yield can be much greater and, in some cases, approach or exceed unity.

Incoming biodegradable material and RAS become nutrients for the microorganisms in the WWTP. The bacteria either use the nutrients for growth (replication) or for cellular maintenance. A small population primarily in stationary phase will use the nutrients to maintain cellular functions (catabolism). A large population primarily in log growth will use the nutrients to produce more cell mass (anabolism). Given a limited nutrient supply, a larger population will undergo more endogenous decay (predation on one another) and the decay rate per unit time is increased.

The BOD required to convert organic matter to cell biomass can be approximated by modeling organic matter as the protein casein. The chemical formula for casein is $C_8H_{12}O_3N_2$. Conversion of BOD and organic matter to cell biomass is represented by the following balanced chemical equation (Reaction 1):

$$C_8H_{12}O_3N_2 + 3O_2 \rightarrow C_5H_7O_2N + 3CO_2 + H_2O + NH_3$$

Every 184 grams of organic matter treated will produce 113 grams of biomass. This exerts a stoichiometric oxygen demand corresponding to three moles of oxygen for every mole of organic matter treated. This reaction produces approximately 0.61 grams of biomass per gram organic matter treated. Conversely, 1.42 grams of organic matter is consumed for every 1 gram of biomass produced. Microbial growth produces off gassing of $CO_2$ and $N_2$ and generates water.

The complete oxidation of biomass to carbon dioxide, water, and ammonia is accurately represented by a second balanced chemical equation (Reaction 2):

$$C_5H_7O_2N + 5O_2 \rightarrow 5CO_2 + 2H_2O + NH_3$$

The first reaction goes essentially to completion (i.e. 100% of the inbound BOD is stabilized and converted to biomass during cell growth). However, the second reaction occurs to the extent that the biodegradable fraction ($1-f_d$) of VSS produced in Reaction 1 is consumed. It is this second reaction that converts VSS mass to gas, thereby reducing the observed yield of outbound solids further below the 60% biosolids yield from equation above. The mass fraction of TOC in BOD is 96/184 or 52%, signifying that carbon makes up over 50% of the total BOD mass to be treated. Similarly, there is available oxygen contained in BOD. The mass fraction of BOD that is oxygen is 48/184 or 26%.

Carbon does not accumulate, but leaves the WWTP as either gas or sludge. The fraction of TOC in BOD that leaves as gas is 36/96 or 37.5%. The balance of the TOC in BOD that remains captured in biomass is 60/96 or 62.5%. It is the remaining biomass that can be further reduced to gas. Of the mass of BOD into the reactor, almost 10% is reduced to liquid water in the basins. A significant amount of water is generated during microbial growth. Organic nitrogen comprises 28/184 or 15% of the BOD mass load. Half of the organic nitrogen is converted through nitrification/denitrification to molecular nitrogen in Reaction 1. Including the TOC and nitrogen that leave the WWTP as gas, approximately 45% of the total inbound organic load to the WWTP is lost as gas as a result of the first reaction alone. The about 45% reduction of BOD mass inbound indicates that the stabilization process (Reaction 1) alone achieves a biomass synthesis yield of around 55%. Improvement in the reduction of the yield from the process occurs as the resulting biomass is further oxidized and gasified through Reaction 2. Reaction 2 describes endogenous decay of the biomass generated within the WWTP. Reaction 2, if complete, converts all the biomass generated into gas, water, and ammonia. In the case of complete conversion, sludge would contain only inert inorganics and inert VSS that had entered the WWTP in the influent. Influent streams with greatly different compositional characterization, such as higher loading concentrations of BOD and chemical oxygen demand (COD) and streams with much higher inert fraction in the influent may show much higher biomass synthesis yields than the 50% to 60% range described here.

Disclosed herein, in certain embodiments, are compositions, methods, and assemblages for enhancing effluent and biosolids quality for reaction vessels and wastewater treatment facilities using a microbial species, or a consortium of microbial species, loaded onto a porous medium.

Certain Definitions

As used herein, "reaction vessel" refers to any system containing microorganisms, in which materials are converted by the microorganisms, products produced by the microorganisms, or in which increase cell population is achieved. Reaction vessels used herein can be one or more of batch reactors, fed-batch reactors, semi-continuous reactors, continuous stirred-tank reactors, continuous flow stirred-tank reactors, and plug-flow reactors, singularly or in series; ebullized-bed (i.e., "bubbling and boiling") reactors; and fluidized-bed reactors. In certain embodiments, the reaction vessel can be an aeration basin or lagoon. In some embodiments, the reaction vessel can be one or more of a trickling bed reactor, percolating reactors, fluidized reactor, plug-flow reaction, counter-current reactor, sequencing batch reactor, rotating biological contactors, oxidation ditch, extended aeration, conventional activated sludge, membrane bioreactor, moving bed biofilm reactor, integrated fixed film activated sludge, trickle bed reactor, sequencing batch reactor, complete mix, step feed, modified aeration, contact stabilization, high purity oxygen reactor, or Kraus process.

As used herein, "wastewater treatment" refers to a process that converts water that is contaminated water or unsuitable for consumption by plants or animals into effluent and biosolids that can be reused for another purpose or returned to the water cycle.

As used herein, the phrase "inorganic porous medium" refers to an inorganic support having a porous structure. In some embodiments, the inorganic porous medium is precipitated silica granules, super absorbent silica polymers, crystalline silica, fused quartz, fumed silica, silica gels, aerogels, colloidal silica, zeolite, aluminosilicate, silicate, diatomaceous earth, or alumina. In some embodiments, zeolite comprises andalusite, kyanite, sillimanite, analcime, chabazite, clinoptilite, mordenite, natrolite, heulandite, phillipsite, or stilbite. In some embodiments, the inorganic porous medium is a mixture of different types of inorganic porous mediums. In some embodiments, the porous structure is loaded with least one microbial species.

As used herein, "delivered microorganisms" refers to bacteria, viruses, mycoplasma, fungi, and protozoa loaded onto an inorganic porous medium. In some embodiments, the microorganisms loaded onto the inorganic porous medium are bacteria. In some embodiments, the microorganisms include a single species of microorganism or a consortium of microorganisms. In some embodiments, the microorganism(s) are selected based on intended use, the available nutrient sources, and the desired operating conditions of the reaction vessel.

As used herein, "carrying capacity" refers to the maximum population that a particular reaction vessel system can support. In a continuous reactor system, such as a WWTP, the carrying capacity is measured as total suspended solids (TSS), mixed liquor suspended solids (MLSS), or volatile suspended solids (VSS). In some examples, the carrying capacity is measured by the increased rate of consumption of glucose or other sugars. In a batch reactor system, the carrying capacity is measured by the peak population density of microorganisms or by measuring the rate of growth of the microorganisms and the rate of nutrient consumption.

Delivered Microorganisms

Disclosed herein, in certain embodiments, are methods of delivering microorganisms. FIG. 1 shows an inorganic porous medium with suitable characteristics for microorganism loading. In some embodiments, characteristics for microorganism loading includes, but is not limited to, loading capability, mineral content, pore size, chemical inertness, and porosity. In some embodiments, a microbial solution containing a single microbial species and nutrients necessary for growth of the microbial species is loaded onto an inorganic porous medium. In some embodiments, a microbial solution containing a consortium of microbial species and nutrients necessary for growth of the microbial species is loaded onto an inorganic porous medium. In some embodiments, the addition of the microbial solution to the inorganic porous medium produces a substance that is dry-to-the-touch creating a dry mode for delivery of microorganism. In some embodiments, the inorganic porous medium comprises zeolite. In some embodiments, the zeolite comprises, but is not limited to, andalusite, kyanite, sillimanite, analcime, chabazite, clinoptilite, mordenite, natrolite, heulandite, phillipsite, or stilbite. In some embodiments, the inorganic porous medium comprises aluminosilicate, silicate, or diatomaceous earth. In some embodiments, the inorganic porous medium is a mixture of different types of inorganic porous mediums. In some embodiments, the inorganic porous medium comprises precipitated silica granules. In some embodiments, precipitated silica granules are highly porous and contain a large surface area both within their volume and on the surface. In some embodiments, one pound of silica granules has approximately 700,000 square feet of surface area. In some embodiments, the surface area provides a matrix upon which a reaction can be accelerated. In some embodiments, precipitated silica granules are also a super absorbent polymer capable of drawing in organic nutrients to be used as building blocks for new bacterial cells and to sustain cellular functions. In some embodiments, as the microorganisms reach exponential growth phase within an inorganic porous medium, they experience crowding effects within the medium and populate the surrounding environment.

In some embodiments, the microorganism comprises a mixed culture of beneficial microbes. In some embodiments, the microorganisms comprise a native, non-pathogenic consortium of microbial species ideal for wastewater applications. In some embodiments, the microbial species are not genetically modified strains. In some embodiments, the microbial species belong to the class of Group 1 microorganisms according to the World Health Organization (WHO), where Group 1 microorganisms are microorganisms unlikely to cause disease. In some embodiments, microorganisms loaded onto an inorganic porous medium produce blooms of beneficial bacteria when placed into an aqueous environment containing a nutrient source in the form of biomass or dead cells.

In some embodiments, the microorganisms loaded onto an inorganic porous medium are delivered to a reaction vessel. In some embodiments, the microorganisms, the nutrients required for optimal growth, and the inorganic porous medium are delivered independently to a reaction vessel. In some embodiments, the microorganisms loaded onto an inorganic porous medium are delivered to a batch reactor. In some embodiments, the microorganisms loaded onto an inorganic porous medium are delivered to a continuous reactor. In some embodiments, the microorganisms loaded onto an inorganic porous medium are delivered to a hybrid of a batch reactor and a continuous reactor. In some embodiments, the reaction vessels are carried out under aerobic or anaerobic conditions depending on the reaction and microorganism(s) involved. In some embodiments, microorganisms loaded onto an inorganic porous medium are used to produce biofuels, including but not limited to methanol, ethanol, or butanol. In some embodiments, microorganisms loaded onto an inorganic porous medium are used to produce biogas. In some embodiments, microorganisms loaded onto an inorganic porous medium are used to enhance wastewater treatment. In some embodiments, microorganisms loaded onto an inorganic porous medium are used to produce amino acids. In some embodiments, microorganisms loaded onto an inorganic porous medium are used to produce therapeutically important peptides.

Microorganism Delivery to a WWTP

Disclosed herein, in certain embodiments, are methods of producing and compositions of a fertilizer or compost derived from a reaction vessel. In some embodiments, microorganisms loaded onto an inorganic porous medium are delivered to a reaction vessel. In some embodiments, the microorganisms are aerobic, anaerobic, or facultative. In some embodiments, the reaction vessel comprises an influent stream, an effluent stream, an aqueous phase, and a biosolids phase. In some embodiments, the biosolids phase comprises nutrients for the microorganisms. In some embodiments, the effluent stream is separated into an aqueous phase and a biosolids phase. In some embodiments, the biosolids phase is dewatered to produce a fertilizer or compost. In some embodiments, the biosolids phase is digested in a digester prior to dewatering. In some embodiments, the influent stream includes, but is not limited to, residential wastewater, agricultural wastewater, industrial wastewater, runoff wastewater or any combination thereof. In some embodiments, adding microorganisms loaded onto an inorganic porous medium to a reaction vessel increases the carrying capacity of the reaction vessel. In some embodiments, adding microorganisms loaded onto an inorganic porous medium to a reaction vessel reduces the quantity of the biosolids phase. In some embodiments, separating the effluent stream into the aqueous phase and the biosolids phase includes, but is not limited to, decantation, filtration, centrifugation, or any combination thereof. In some embodiments, dewatering the biosolids phase includes centrifugation and filtration.

In some embodiments, the reaction vessel is part of a WWTP. In some embodiments, the reaction vessel is an aeration basin, lagoon, or lake. In some embodiments, the WWTP is modeled as a chemostat. In some embodiments, the microorganisms are bacterial. In some embodiments, the WWTP must produce as many bacteria as wash out in the effluent stream. In some embodiments, washing out of the bacteria leads to a WWTP devoid of beneficial bacteria. In some embodiments, growth rate of a single microbial species within a WWTP are described by Michaelis-Menten kinetics. In some embodiments, the bacteria will grow exponentially until the food source is depleted and crowding occurs. In some embodiments, exponential growth is log-linear and corresponds to a short doubling time for the microbial population. In some embodiments, nutrient consumption is rapid during exponential growth. In some embodiments, when the reaction vessel carrying capacity is reached, the microorganisms enter a stationary phase. In some embodiments, during the stationary phase the number of microorganisms produced is equal to the number of microorganisms consumed and the overall population remains unchanged. In some embodiments, during the stationary phase substrate uptake corresponds to a "maintenance" requirement. In some embodiments, the microbial population in a WWTP consists primarily of microorganism in the stationary phase. In some embodiments, the nutrients have been depleted and the microorganism population begins to decline by endogenous decay. In some embodiments, endogenous decay involves cell lysis and the conversion of dead cell mass into nutrients for other viable microorganisms. In some embodiments, the activated sludge is recycled back to the aeration basin to allow the dead cells to become nutrients for younger microorganisms. In some embodiments, microorganisms loaded onto an inorganic porous medium drive the WWTP towards greater endogenous decay and cause more mass to leave as gas. In some embodiments, higher microbial activity means more highly treated water.

In some embodiments, the inorganic porous medium is selected or modified for sorption of nitrogen, phosphorous, or both nitrogen or phosphorous from an aqueous phase of a reaction vessel. In some embodiments, the phosphorous is an organic or an inorganic aqueous phosphorous. In some embodiments, sorption of nitrogen and/or phosphorous from an aqueous phase of a reaction vessel increases a nutrient concentration of a fertilizer or compost produced from the reaction vessel. In some embodiments, sorption of nitrogen and/or phosphorous from an aqueous phase of a reaction vessel decreases the amount of nitrogen and/or phosphorous in the aqueous phases. In some embodiments, the inorganic porous medium may be chemically or physically modified. In some embodiments, chemical modification includes the addition of chelating agents, ligands, or salts (e.g., magnesium salts) that lead to precipitation of compounds that referentially bind ammonia and phosphorous. In some embodiments, physical modification includes roughening the surfaces of the porous medium, increasing porosity of the porous medium, inducing the formation of aggregates or agglomerates from smaller particles of the inorganic porous media using coagulation and flocculation agents, or any combination thereof.

In some embodiments, a flocculating agent is added to the effluent stream to produce an aqueous phase and a filter cake. In some embodiments, the flocculating agent is one or more of an ionic polymer, a non-ionic polymer, or any combination thereof. In some embodiments, the ionic polymer is a cationic polymer. In some embodiments, the ionic polymer is an anionic polymer. In some embodiments, flocculating agents include aluminum chloride, ferric chloride, and alum. In some embodiments, the cationic polymer is a copolymer of AETAC (N,N-Dimethylaminoethyl Acrylate Methyl Chloride Quaternary) or METAC (N,N-Dimethylaminoethyl Methacrylate Methyl Chloride Quaternary) and acrylamide. In some embodiments, flocculating agents perform a dual function of coagulating with their positive ionic charge and flocculating with their high molecular weight. In some embodiments, the anionic polymer is a copolymer of acrylamide and acrylic acid. In some embodiments, there is at least about a 45% reduction in the consumption of flocculating agents, when compared to systems that do not employ delivered microorganisms. In some embodiments, there is at least about a 40% reduction in the consumption of flocculating agents. In some embodiments, there is at least about a 35% reduction in the consumption of flocculating agents. In some embodiments, there is at least about a 30% reduction in the consumption of flocculating agents. In some embodiments, there is at least about a 25% reduction in the consumption of flocculating agents. In some embodiments, there is at least about a 20% reduction in the consumption of flocculating agents.

In some embodiments, the concentration of MLSS in the effluent is greater than about 7,000 mg/L. In some embodiments, the concentration of MLSS in the effluent is greater than about 8,000 mg/L. In some embodiments, the concentration of MLSS in the effluent is greater than about 9,000 mg/L. In some embodiments, the concentration of MLSS in the effluent is greater than about 10,000 mg/L. In some embodiments, the concentration of MLSS in the effluent is greater than about 11,000 mg/L. In some embodiments, the concentration of MLSS in the effluent is greater than about 12,000 mg/L. In some embodiments, increasing the MLSS is an important measure for determining the load delivered to a solid separator, such as a clarifier. In some embodiments, the settling characteristics of the MLSS vary from system to system. In some embodiments, the settling characteristics of the MLSS determine the upper boundary of solids concentration of MLSS being fed to a clarifier or other type of solid liquid separator. In some embodiments, the solid liquid separator surface area and the mass rate of suspended solids introduced to the clarifier are used to determine the mass flux. In some embodiments, the mass flux is a process design parameter for determining the operational size of the clarifier. In some embodiments, a higher MLSS also has a higher VSS. In some embodiments, a higher VSS indicates higher beneficial microbial activity in the WWTP operations.

In some embodiments, the SRT is greater than twenty days. In some embodiments, the SRT is greater than thirty days. In some embodiments, the SRT is greater than forty days. In some embodiments, the SRT is greater than forty-five days. In some embodiments, the SRT of the sludge or solids is greater than fifty days. In some embodiments, the SRT is greater than sixty days. In some embodiments, the SRT is increased by greater than or equal to about 1%, 2%, 5%, 10%, 20%, 25%, 30%, 40%, 50%, 60%, 70%, 80%, 90%, 100%, 150%, 200%, 250%, 300%, or more when the delivered microorganism is used in a WWTP.

In some embodiments, the SRT of the solids is maintained constant between a WWTP that does not use delivered microorganisms and a system that does use delivered microorganisms. In some embodiments, when SRT of the solids is maintained constant, there is at greater than or equal to a 2.5% reduction in solids or sludge produced, as compared to the same system without the use of delivered microorganisms. In some embodiments, when SRT of the solids is maintained constant, there is greater than or equal to a 5% reduction in solids or sludge produced, as compared to the same system without the use of delivered microorganisms. In some embodiments, when SRT of the solids is maintained constant, there is greater than or equal to a 7.5% reduction in solids or sludge produced, as compared to the same system without the use of delivered microorganisms. In some embodiments, when SRT of the solids is maintained constant, there is greater than or equal to a 10% reduction in solids or sludge produced, as compared to the same system without the use of delivered microorganisms. In some embodiments, when SRT of the solids is maintained constant, there is greater than or equal to a 15% reduction in solids or sludge produced, as compared to the same system without the use of delivered microorganisms. In some embodiments, when SRT of the solids is maintained constant, there is greater than or equal to a 20% reduction in solids or sludge produced, as compared to the same system without the use of delivered microorganisms. In some embodiments, when SRT of the solids is maintained constant, there is greater than or equal to a 25% reduction in solids or sludge produced, as compared to the same system without the use of delivered microorganisms. In some embodiments, when SRT is maintained constant, there is greater than or equal to a 30% reduction in solids or sludge produced, as compared to the same system without the use of delivered microorganisms. In some embodiments, when SRT of the solids is maintained constant, there is greater than or equal to a 40% reduction in solids or sludge produced, as compared to the same system without the use of delivered microorganisms.

In some embodiments, the sludge produced at a WWTP is reduced by at least about 40% as compared to systems that do not employ delivered microorganisms. In some embodiments, the sludge produced at a WWTP is reduced by at least about 30%. In some embodiments, the sludge produced at a WWTP is reduced by at least about 25%. In some embodiments, the sludge produced at a WWTP is reduced by at least about 20%. In some embodiments, the sludge produced at a WWTP is reduced by at least about 15%. In some embodiments, the economic benefit of sludge reduction includes financial savings, time savings, a reduction in personnel resources associated with sludge disposal, reduction in consumption of flocculating agents such as polymers, increase in equipment life, and reduction in equipment maintenance costs. In some embodiments, a reduction in WWTP operational costs includes lower oxygen demand, higher blower efficiency, decreased qualitative and quantitative use of chemicals for sanitation, and extended WWTP life. Key operating parameters for a WWTP system employing delivered microorganisms is shown in Table 2.

TABLE 2

Design Parameters for Activated Sludge Processes

| Process Modification | SRT (DAYS) | F/M lbs. BOD/lb. MLVSS/day | Organic Loading (lbs. BOD/1000 ft$^3$) | MLSS (mg/L) | Detention Time (Hours) | Return Flow to Plant Flow |
|---|---|---|---|---|---|---|
| Delivery microorganisms | 30-50 | 0.5-0.05 | 20-200 | 7,000-11,000 | 4-17 | .5-2.0 |

In some embodiments, the yield which is measured as a unit mass of waste produced per unit mass of organic loading is less than about 40%. In some embodiments, the yield is less than about 30%. In some embodiments, the yield is less than about 20%. In some embodiments, lower yield represents minimization or reduction of biosolids for wastewater treatment.

In some embodiments, the dewatered biosolids phase produced after the addition of microorganisms loaded onto an inorganic porous medium is of an enhanced quality compared to a biosolids phase produced without the addition of microorganisms loaded onto an inorganic porous medium. In some embodiments, the enhanced dewatered biosolids contain at least 1,500 ppm, 1,250 ppm, 1,000 ppm, 750 ppm, 500 ppm, 250 ppm, or fewer ppm of an inorganic porous medium on a dry basis. In some embodiments, the enhanced dewatered biosolids contain at least about 500 ppm of an inorganic porous medium on a dry basis. In some embodiments, the enhanced dewatered biosolids contain less than about 150 ppm, 125 ppm, 100 ppm, 75 ppm, 50 ppm, 25 ppm, or fewer ppm arsenic. In some embodiments, the enhanced dewatered biosolids contain less about 41 ppm arsenic. In some embodiments, the enhanced dewatered biosolids contain less than about 150 ppm, 125 ppm, 100 ppm, 75 ppm, 50 ppm, 25 ppm, or fewer ppm cadmium. In some embodiments, the enhanced dewatered biosolids contain less than about 39 ppm cadmium. In some embodiments, the enhanced dewatered biosolids contain less than about 2,500 ppm, 2,000 ppm, 1,500 ppm, 1,000 ppm, 500 ppm, or fewer ppm chromium. In some embodiments, the enhanced dewatered biosolids contain less than about 1,200 ppm chromium. In some embodiments, the enhanced dewatered biosolids contain less than about 3,000 ppm, 2,500 ppm, 2,000 ppm, 1,500 ppm, 1,000 ppm, 500 ppm, or fewer ppm copper. In some embodiments, the enhanced dewatered biosolids contain less than about 1,500 ppm copper. In some embodiments, the enhanced dewatered biosolids contain less than about 1000 ppm, 750 ppm, 500 ppm, 250 ppm, or fewer ppm lead. In some embodiments, the enhanced dewatered biosolids contain less than about 300 ppm lead. In some embodiments, the enhanced dewatered biosolids contain less than about 100 ppm, 75 ppm, 500 ppm, 25 ppm, 15 ppm, or fewer ppm mercury. In some embodiments, the enhanced dewatered biosolids contain less than about 17 ppm mercury. In some embodiments, the enhanced dewatered biosolids contain less than about 1000 ppm, 500 ppm, 400 ppm, 300 ppm, 200 ppm, or fewer ppm nickel. In some embodiments, the enhanced dewatered biosolids contain less than about 420 ppm nickel. In some embodiments, the enhanced dewatered biosolids contain less than about 150 ppm, 100 ppm, 75 ppm, 50 ppm, 25 ppm, or fewer ppm selenium. In some embodiments, the enhanced dewatered biosolids contain less than about 36 ppm selenium. In some embodiments, the enhanced dewatered biosolids contain less than about 7,500 ppm, 5,000 ppm, 2,500 ppm, 1,000 ppm, or fewer ppm zinc. In some embodiments, the enhanced dewatered biosolids contain less than about 2,800 ppm zinc.

In some embodiments, the enhanced dewatered biosolids contains a concentration of *Salmonella enterica* spp. less than about 10 most probable number (MPN), 8 MPN, 5 MPN, 3 MPN, or fewer MPN. In some embodiments, the enhanced dewatered biosolids contain less than about 3 MPN *Salmonella enterica* spp. In some embodiments, the enhanced dewatered biosolids contains a total concentration of fecal coliform bacteria of less than about 2,000 MPN, 1,500 MPN, 1,250 MPN, 1,000 MPN, 750 MPN, or fewer MPN. In some embodiments, the enhanced dewatered biosolids contain less than about 1000 MPN of fecal coliform. In some embodiments, the enhanced dewatered biosolids contain less than about 10 plaque-forming unit (PFU), 8 PFU, 4 PFU, 2 PFU, 1 PFU, or less PFU of enteric viruses per four grams of total solids on a dry basis. In some embodiments, the enhanced dewatered biosolids contain less than about 1 PFU of enteric viruses per four grams of total solid on a dry basis. In some embodiments, enteric viruses include human astroviruses, human adenoviruses, noroviruses, human sapoviruses, human parvoviruses, non-polio enteroviruses, and human rotoviruses. In some embodiments, the enhanced dewatered biosolids contain less than about 10, 8, 4, 2, 1 or less viable helminth ova per four grams of total solids on a dry basis and with a vector attraction standard oxygen uptake rate of less than about 5 mg, 4 mg, 3 mg, 1.5 mg, or less mg of oxygen per gram of solids per hour. In some embodiments, the enhanced dewatered biosolids contain less than about 1 viable helminth ova per four grams of total solids on a dry basis and with a vector attraction standard oxygen uptake rate of less than about 1.5 mg of oxygen per gram of solids per hour.

In some embodiments, the enhanced dewatered biosolids comprise less than about 41 ppm arsenic, less than about 39 ppm cadmium, less than about 1,200 ppm chromium, less than about 1,500 ppm copper, less than about 300 ppm lead, less than about 17 ppm mercury, less than about 420 ppm nickel, less than about 36 ppm selenium, and less than about 2,800 ppm zinc; a concentration of *Salmonella enterica* spp. below about 3 most probable number (MPN) per 4 grams of total solids on a dry basis; a total concentration of fecal coliform bacteria less than about 1000 MPN per gram of total solids on a dry basis; a density of enteric viruses less than about 1 plaque-forming unit (PFU) per 4 grams of total solids on a dry basis; and/or a density of viable helminth ova less than about 1 per 4 grams of total solids on a dry basis with a vector attraction standard oxygen uptake rate of less than about 1.5 milligrams of oxygen per gram of solids per hour.

In some embodiments, the enhanced dewatered biosolids comprise no more than 41 ppm arsenic, no more than 39 ppm cadmium, no more than 1,200 ppm chromium, no more than 1,500 ppm copper, no more than 300 ppm lead, no more than 17 ppm mercury, no more than 420 ppm nickel, no more than 36 ppm selenium, and no more than 2,800 ppm zinc; a concentration of *Salmonella enterica* spp. no more than 3 most probable number (MPN) per 4 grams of total solids on a dry basis; a total concentration of fecal coliform bacteria no more than 1000 MPN per gram of total solids on a dry basis; a density of enteric viruses no more than 1 plaque-forming unit (PFU) per 4 grams of total solids on a dry basis; and/or a density of viable helminth ova no more than 1 per 4 grams of total solids on a dry basis with a vector attraction standard oxygen uptake rate of no more than 1.5 milligrams of oxygen per gram of solids per hour.

In some embodiments, the effluent stream produced after the addition of delivered microorganisms is of an enhanced quality compared to an effluent produced without the addition of microorganisms loaded onto an inorganic porous medium. In some embodiments, the effluent stream has a reduced ammonia concentration. In some embodiments, the ammonia concentration is less than about 1 mg/L, 0.75 mg/L, 0.5 mg/L, 0.25 mg/L, 0.1 mg/L, or fewer mg/L. In some embodiments, the ammonia concentration is less than about 0.2 mg/L. In some embodiments, the ammonia concentration is less than the analytical detection limit. In some embodiments, the reaction vessel is operated under aerobic conditions. In some embodiments, the microorganisms consume ammonia under aerobic conditions to produce nitrite and nitrate. In some embodiments, the ammonia is converted to nitrite and nitrate. In some embodiments, the concentration of nitrates and nitrites is less than about 50 mg/L, 40 mg/L, 30 mg/L, 20 mg/L, 10 mg/L, 5 mg/L, 2.5 mg/L, or fewer mg/L. In some embodiments, the concentration of nitrates and nitrites is in the range of about 5 mg/L to 30 mg/L. In some embodiments, the effluent stream is denitrified. In some embodiments, the reaction vessel is operated under anaerobic conditions. In some embodiments, the microorganisms consume nitrate and nitrate under anaerobic conditions to produce molecular nitrogen. In some embodiments, a reduction in ammonia and denitrification does not require a chlorinator, ozonator, or the use of a peroxide, bleach or ultra-violet light. In some embodiments, the phosphorous concentration in the effluent is reduced. In some embodiments, the concentration of phosphorous in the effluent is less than about 20 mg/L, 10 mg/L, 5 mg/L, 2.5 mg/L, or fewer mg/L. In some embodiments, the concentration of phosphorus in the effluent is less than about 3 mg/L. In some embodiments, the microorganisms consume phosphorous. In some embodiments, the consumed phosphorous is incorporated into cell biomass. In some embodiments, the removal of soluble phosphorous reduces or prevents eutrophication. In some embodiments, phosphorous removal does not require phosphate precipitation with calcium, aluminum, iron, or magnesium. In some embodiments, phosphorous removal is achieved under anaerobic conditions. In some embodiments, phosphorous removal is achieved under aerobic conditions.

WWTP Using Delivered Microorganisms

Figure 2:
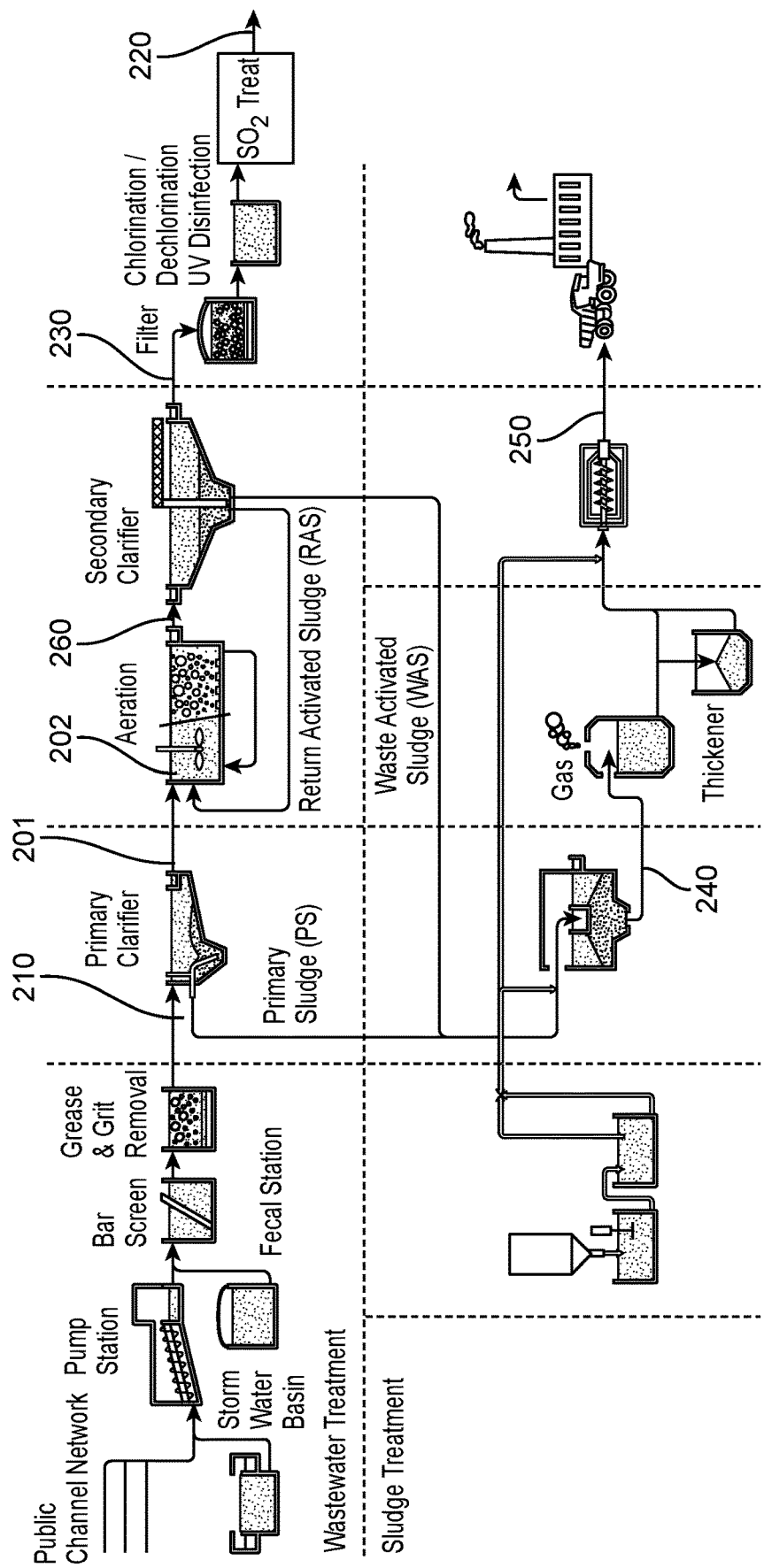
FIG. 2 illustrates an example wastewater treatment plant with marked locations for microorganism delivery and sample extraction.

Disclosed herein, in certain embodiments, are assemblages for treating wastewater using delivered microorganisms. FIG. 2 shows an example WWTP with example locations to add delivered microorganisms and locations to extract test samples. In some embodiments, the delivered microorganisms are added to the inlet stream before the aeration basin 201 or to the aeration basin 202. In some embodiments, test samples are extracted from the influent stream 210. In some embodiments, test samples are extracted from the effluent 220. In some embodiments, test samples are extracted from the clarifier overflow 230. In some embodiments, test samples are extracted after the digester 240. In some embodiments, test samples are extracted from the filter cake 250. In some embodiments, test samples are extracted from or after the aeration basin 260. In some embodiments, test samples are analyzed for total volatile suspended solids, ammonia, COD, TSS, BOD, nitrate and nitrite as elemental nitrogen, phosphorous, and alkalinity. In some embodiments, total volatile suspended solids are analyzed following EPA method 160.4 (Environmental Protection Agency. (1971). *Method 160.4: Residue, Volatile (Gravimetric, Ignition at 550° C.) by Muffle Furnace*). In some embodiments, ammonia is analyzed following EPA method 350.1 (Environmental Protection Agency (1993). *Method 350.1: determination of ammonia nitrogen by Semi-Automated Colorimetry*). In some embodiments, COD is analyzed following an EPA approved method supplied by the Hach Company, HACH 8000. In some embodiments, TSS are analyzed following Standard Methods 2540D (Eaton, A. D., Clesceri, L. S., Greenberg, A. E., Franson, M. A. H., American Public Health Association, American Water Works Association, and Water Environment Federation. (2012). *Standard methods for the examination of water and wastewater*. Washington, D.C.: American Public Health Association). In some embodiments, BOD is analyzed following Standard Methods 5210B. In some embodiments, nitrates and nitrates are analyzed as elemental nitrogen following EPA method 300.0 (Environmental Protection Agency (1993). *Method 300.0: determination of inorganic anions by ion chromatography*). In some embodiments, phosphorous is analyzed by Standard Method 4500P. In some embodiments, Alkalinity is analyzed by Standard Methods 2320A.

In some embodiments, an assemblage for treating wastewater comprises one or more influent streams, one or more aeration basins or aeration lagoons, one or more separators, and one or more effluent streams. In some embodiments, the influent stream comprises an aqueous phase and a biosolids phase. In some embodiments, the influent stream includes residential wastewater, agricultural wastewater, industrial wastewater, runoff wastewater, or any combination thereof. In some embodiments, the aeration basins comprise at least one inlet stream and at least one outlet stream. In some embodiments, the separator separates the aqueous phase from the biosolids phase. In some embodiments, the delivered microorganisms are added upstream of the aeration basin. In some embodiments, the delivered microorganisms are added to the aeration basin or aeration lagoon. In some embodiments, the aeration basin is configured to mix wastewater with the microorganism loaded onto the inorganic porous medium. In some embodiments, the wastewater treatment assemblage has an increased carrying capacity. In some embodiments, the outlet stream of the aeration basin has a microbial activity at least twice that of the inlet stream.

In some embodiments, a first separator is configured to receive wastewater from the aeration basin or aeration lagoon to produce a first fraction containing biosolids and a treated water stream. In some embodiments, a second separator is configured to receive the first fraction containing biosolids to produce a second fraction containing biosolids and a waste product stream containing biosolids. In some embodiments, the second fraction is recycled to the aeration basin. In some embodiments, the assemblage includes a third separator configured to produce a treated water stream and a filter cake. In some embodiments, a biosolids fraction from the first, second, or third separator is directed to a reaction vessel to produce digested products. In some embodiments, the reaction vessel that produces digested products in a digester. In some embodiments, the digested products are directed to an additional separator configured to remove the aqueous phase from the digested product and produce a filter cake. In some embodiments, a RAS line carries a portion of the biosolids phase from the separator back to the aeration basin. In some embodiments, the portion of the biosolids phase returned to the aeration basin increases the TSS in the aeration basin by 25%. In some embodiments, the portion of the biosolids phase returned to the aeration basin increases the TSS in the aeration basin by 50%. In some embodiments, the portion of the biosolids phase returned to the aeration basin increases the TSS in the aeration basin by 100%. In some embodiments, the concentration of MLSS is greater than 7000 g/L. In some embodiments, SRT in the aeration basin is greater than twenty days. In some embodiments, a WAS line carries a second portion of the biosolids phase to a dewaterer that dewaters the biosolid phase. In some embodiments, the assemblage does not comprise a chlorinator or an ozonator. In some embodiments, the separator comprises a decanter, filter, centrifuge, or combination thereof.

EXAMPLES

Example 1: Biosolids Reclassification Based on Pathogen Limits and Vector Attraction Based on Standard Oxygen Uptake Rates A test facility was selected at the Kingwood-Central wastewater treatment facility in Kingwood, Tex. This specific plant has an excellent record of meeting compliance. The Kingwood-Central wastewater treatment facility has an average daily flow rate of 5.0 million gallons of wastewater. The test began in March of 2015 with the introduction of a microbial species loaded onto an inorganic porous medium, or delivered microorganisms, to the aeration basins of the plant at a rate of 15 pounds per day. The delivered microorganisms were applied either once per day or applied in three hour increments until a total of 15 pounds was added. An independent contractor collected and performed sample analytics that provide data acquisition over the entire test period. These additional samples and analytics augmented the standard analytics performed by the operator. The test period covered a total of 21 months, from March 2015 through October 2016.

Improved Filter Cake Quality

The performance of the delivered microorganisms show a reduction of fecal coliform to 1,100 or less cfg/g of total solids and a vector attraction based on Standard Oxygen Uptake Rate (SOUR) ranging from 0.24 to 0.39 mg of oxygen per gram of solids per hour.

Analytical results prior to the testing period are shown in Table 3 for the period starting in October 2013 and ending in December 2014. Data from the historical operation of the plant is used as a baseline for comparison.

TABLE 3

Analytical Results from October 2013 to December 2014.

| Parameters | Sample date | | |
|---|---|---|---|
| | Oct. 10, 2013 Cake | Sep. 2, 2014 Cake | Dec. 23, 2014 Cake |
| pH (Units) | 6.57 | 7.19 | 7.47 |
| Tot. Nitrogen-N (%) | 0.53 | 0.53 | 0.64 |
| NO3—N (%) | 0.02 | 0.02 | 0.01 |
| NH3—N (%) | 0.01 | 0.4 | 0.03 |
| Phosphorus pentoxide (%) | 0.02 | 1.13 | 1.05 |
| Potassium % | 0.24 | 0.08 | 0.13 |
| Arsenic (mg/kg) | 4.21 | 3.7 | 2.45 |
| Cadmium (mg/kg) | 1.75 | 1.23 | 0.61 |
| Copper (mg/kg) | 781.96 | 608.8 | 422.49 |
| Molybdenum (mg/kg) | 14.38 | 11.11 | 9.81 |
| Nickel (mg/kg) | 16.83 | 12.75 | 9.2 |
| Lead (mg/kg) | 28.4 | 25.5 | 15.94 |
| Chromium (mg/kg) | 26.65 | 20.57 | 13.49 |
| Mercury (mg/kg) | 0.07 | 0.08 | 0.12 |
| Selenium (mg/kg) | 8.77 | 5.76 | 5.52 |
| Zinc (mg/kg) | 1171.19 | 1028.38 | 766.49 |
| PCB's (mg/kg) | 1 | 1 | 1 |
| Fecal coliform (cfg/g/TS) | 12,900 | 110,000 | 5,700 |
| SOUR (mg O2/g/hr) | 0.3 | 0.25 | 1.2 |
| Total solids (%) | 14.7 | 18.7 | 15.1 |
| Volatile solids (%) | 7.7 | 9.2 | 9 |
| Organic concentration (%) | 52.4 | 49.2 | 59.6 |

Analytical results from the test period are shown in Table 4. Use of a microbial species loaded onto an inorganic porous medium decreased the fecal coliform.

TABLE 4

Analytical Results from August 2015 to July 2016.

| Parameters | Sample date | |
|---|---|---|
| | Aug. 15, 2015 Cake | Jul. 31, 2016 Cake |
| pH (Units) | 6.75 | 6.27 |
| Tot. Nitrogen-N (%) | 0.58 | 0.18 |
| NO3—N (%) | 0.03 | 0.05 |
| NH3—N (%) | 0.05 | 0.03 |
| Phosphorus pentoxide (%) | 1.36 | 0.73 |
| Potassium % | 0.18 | 0.15 |
| Arsenic (mg/kg) | 2.02 | 0.64 |
| Cadmium (mg/kg) | 2.02 | 1.93 |
| Copper (mg/kg) | 597.1 | 633.07 |
| Molybdenum (mg/kg) | 10.76 | 9.03 |
| Nickel (mg/kg) | 12.1 | 12.89 |
| Lead (mg/kg) | 26.9 | 20.63 |
| Chromium (mg/kg) | 26.22 | 20.63 |
| Mercury (mg/kg) | 0.13 | 0.13 |
| Selenium (mg/kg) | 6.05 | 7.74 |

TABLE 4-continued

Analytical Results from August 2015 to July 2016.

| Parameters | Sample date | |
|---|---|---|
| | Aug. 15, 2015 Cake | Jul. 31, 2016 Cake |
| Zinc (mg/kg) | 974.99 | 1205.55 |
| PCB's (mg/kg) | 1 | 1 |
| Fecal coliform (cfg/g/TS) | <1000 | 1,100 |
| SOUR (mg O2/g/hr) | 0.39 | 0.24 |
| Total solids (%) | 14.3 | 15.7 |
| Volatile solids (%) | 7.6 | 7.52 |
| Organic concentration (%) | 53.1 | 47.9 |

Ammonia Reduction

Samples were taken at the inlet to the plant, at the clarified overflow, from the digester, and from the aqueous effluent from the plant. Ammonia samples were analyzed by EPA Method 350.1 and Nitrates were analyzed by EPA method 352.1 (Environmental Protection Agency. (1971). *Method 350.1: Nitrogen, Nitrate*). Analysis results are shown in Table 5 and Table 6 for ammonia and nitrate, respectively. Use of a microbial species loaded onto an inorganic porous medium reduced the ammonia at the clarifier overflow by 96% and at the digester by 75%.

TABLE 5

Analytical Results of Ammonia Concentration.

| | (in mg/l) | | | |
|---|---|---|---|---|
| Ammonia | Influent | Clarifier OF | Digester | Effluent |
| Baseline | 30 | 13 | 13 | 0.2 |
| Delivered Microorganisms | 31 | 0.6 | 3 | 0.2 |

TABLE 6

Analytical Results of Nitrate Concentration.

| | (in mg/l) | | | |
|---|---|---|---|---|
| Nitrate/Nitrite | Influent | Clarifier OF | Digester | Effluent |
| Baseline | 0.7 | 17 | 0.6 | 17 |
| Delivered Microorganisms | 0.7 | 19 | 1.2 | 18 |

Nitrification and Denitrification in the Digester

The performance of the delivered microorganisms shows a 90% reduction of total nitrogen as ammonia and nitrate/nitrite compared to the baseline reduction of 70% when comparing the WAS concentrations to the existing digester concentrations. The ammonia was reduced by only 64% in the baseline period and had an average of 13 mg/L present in the digester (Table 6).

Further evidence of complete nitrification and denitrification is illustrated by the gain in alkalinity in the digester where the daily average of alkalinity increased by 71% during the test period over that present during the baseline period. Table 7 shows the digester alkalinity.

TABLE 7

Analytical Results of Digester Alkalinity.

|  | Digester Alkalinity (mg/l) |
| --- | --- |
| Baseline | 304 |
| Delivered Microorganisms | 520 |

Bleach or Chlorine Reduction

The test plant uses chlorine bleach to disinfect the wastewater effluent from the treatment plant. The chlorine also destroys any ammonia in the effluent. The use of delivered microorganisms results in a significant decrease in the amount of chlorine bleach being used. Table 8 shows gallons of chlorine bleach used during the testing period and during the baseline period.

Figure 3:
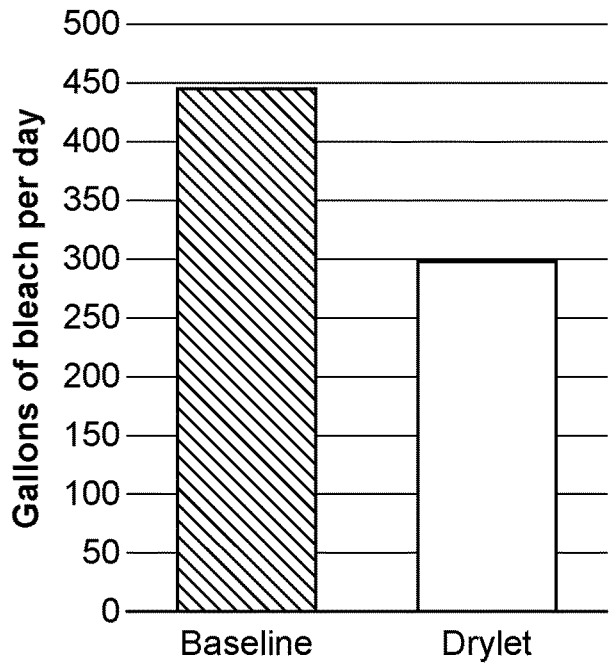
FIG. 3 illustrates the amount of bleach used at a test facility during a test period and a control period.

FIG. 3 shows the baseline average bleach use and the test period bleach use. The use of the delivered microorganism decreased the average bleach used from 447 gallons per day to 298 gallons per day. Table 9 shows the daily average mass use of bleach and bisulfite and the daily average chlorine residual. The use of chlorine bleach requires the plant to employ sulfur dioxide to reduce the residual chlorine level in the effluent.

TABLE 8

Daily Average Chlorine Bleach Use

| Period | Bleach (gals) | # days | Daily avg, gals bleach |
| --- | --- | --- | --- |
| Baseline | 28,580 | 64 | 447 |
| Delivered Microorganisms | 32,180 | 108 | 298 |

TABLE 9

Daily Average Chlorine Bleach Mass and Bisulfite and Residual Chlorine Levels

| Period | Bleach (Mt) | SO2 (Mt) | SO2/Bleach | $CL_2$ residual |
| --- | --- | --- | --- | --- |
| Baseline | 2.17 | 0.124 | 0.057 | 4.742 |
| Delivered Microorganisms | 1.35 | 0.123 | 0.091 | 4.579 |

Sour Reduction

The performance of the delivered microorganism shows a reduction in mixed liquor SOUR measured as milligram of oxygen per liter per gram VSS per hour. Samples are taken from the aeration basin and analyzed by standard thermogravimetric analysis (TGA) following EPA method 160.2. Typical values for samples from an aeration basin fall in a range from about 15 to 20 mg $O_2$/L/g VSS/hr. SOUR values decreased to a lower range after application of the delivered microorganism to values ranging from 3 to 6 mg $O_2$/L/g VSS/hr.

Figure 4:
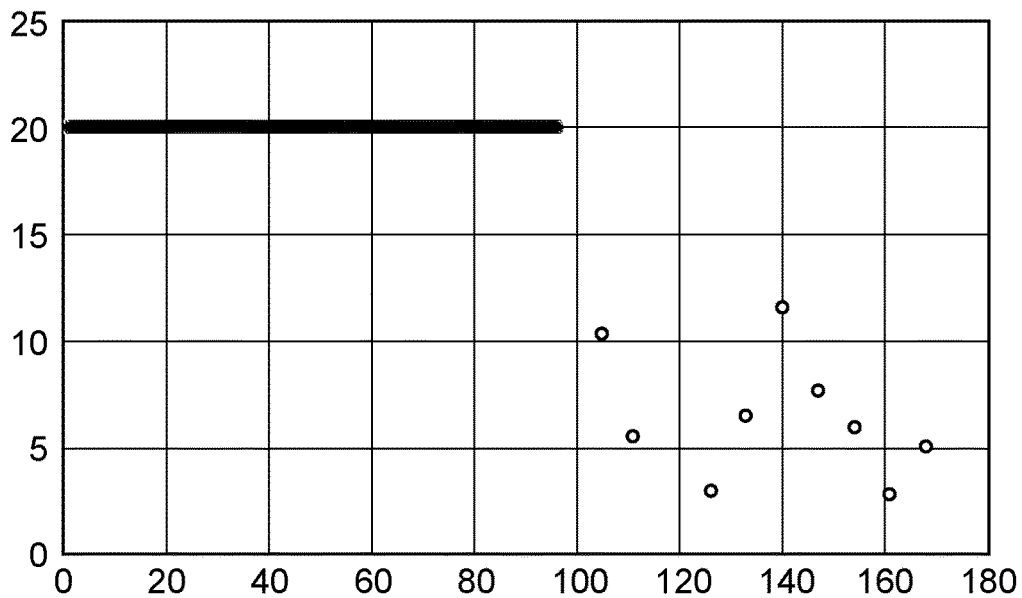
FIG. 4 illustrates the Specific Oxygen Uptake Rate (SOUR) at a test facility during a test period and a control period

FIG. 4 shows data from the baseline time period, recognized standard values, and data from the testing period when delivered microorganism were used. The SOUR data measured during the testing period fall well below the typical values, which are shown as a solid line in FIG. 4.

Example 2: Phosphorous Removal

A test facility was selected at the wastewater treatment plant in Beaumont, Tex. This specific plant had an excellent record of meeting compliance. The wastewater treatment facility had an average daily flow rate of 20 million gallons per day wastewater treated. Testing began in Spring 2016 with the introduction of microorganisms loaded onto an inorganic porous medium, or delivered microorganisms, to a Trickling Bed Filter plant at a rate of 30 pounds per day. See FIG. 2 for a diagram of a treatment system, microorganism delivery locations, and sampling locations. The test period covered a total of four months, from April 2016 to June 2016.

Figure 5:
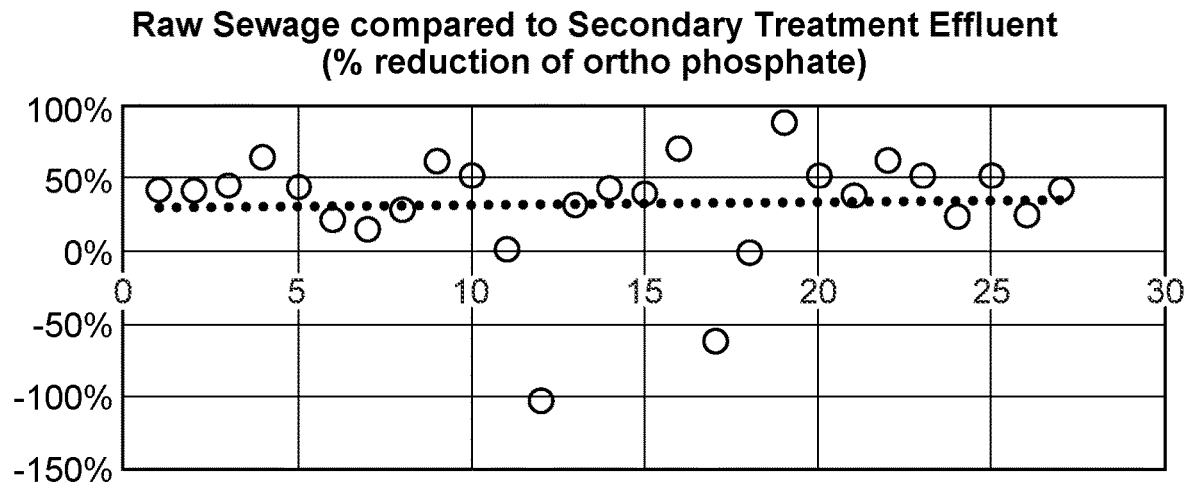
FIG. 5 illustrates a percentage of phosphate removed from raw sewage to a secondary treatment effluent.
Figure 6:
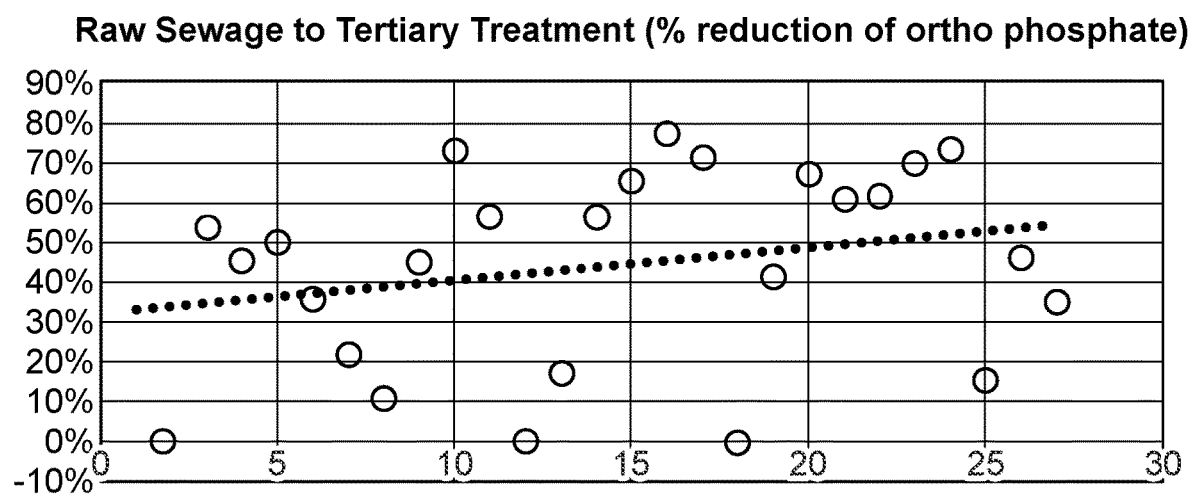
FIG. 6 illustrates a percentage of phosphate removed from raw sewage to a tertiary treatment in wastewater ponds.

Orthophosphate levels in the influent are tracked along with phosphate levels leaving the secondary clarifiers (SCE) the day following the addition of the delivered microorganism. Orthophosphate levels and phosphate levels were analyzed using Standard Methods EPA approved 4500-P phosphorus analysis. The orthophosphate and phosphate levels were compared with phosphorous levels in the large retention pond two days after adding the delivered microorganisms. FIG. 5 shows the orthophosphate level of the wastewater leaving the SCE. Open circles represent data taken during the testing period and the dashed line represents the linear regression of the data. The data show a slight increasing trend in phosphate removal from the entering raw sewage to after SCE treatment. FIG. 6 shows the orthophosphate level of wastewater in the large retention pond. Open circles represent data taken during the testing period and the dashed line represents the linear regression of the data. The data shows a steep increasing trend in phosphate removal from entering raw sewage to wastewater in the large retention pond.

Example 3: Zeolite Use

Figure 7:
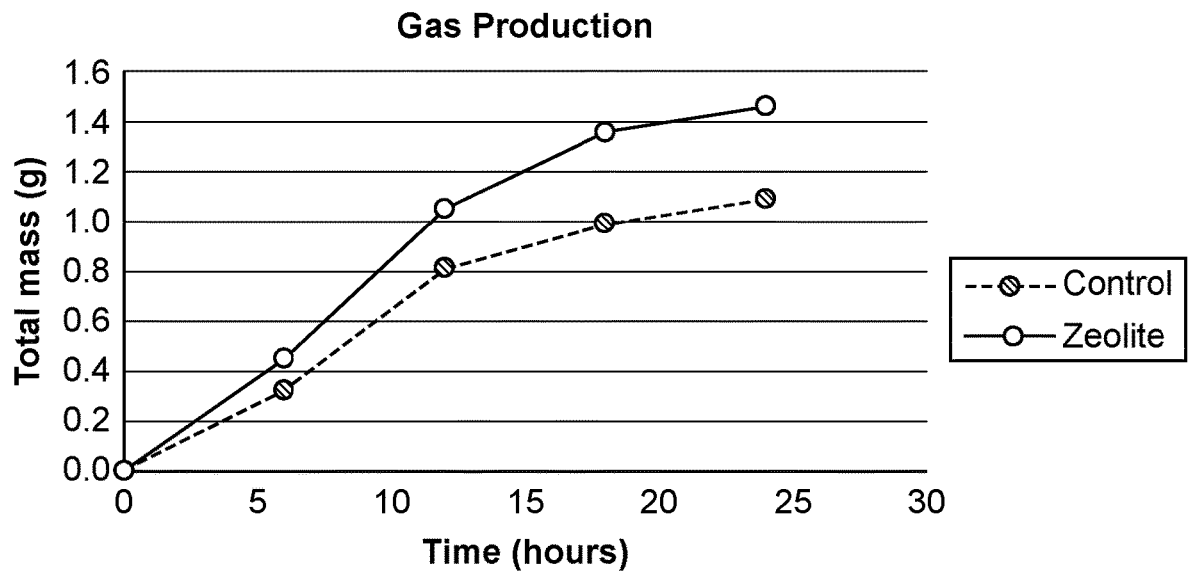
FIG. 7 illustrates total mass of gas produced by microorganisms loaded onto zeolite and microorganisms in a liquid culture.
Figure 8:
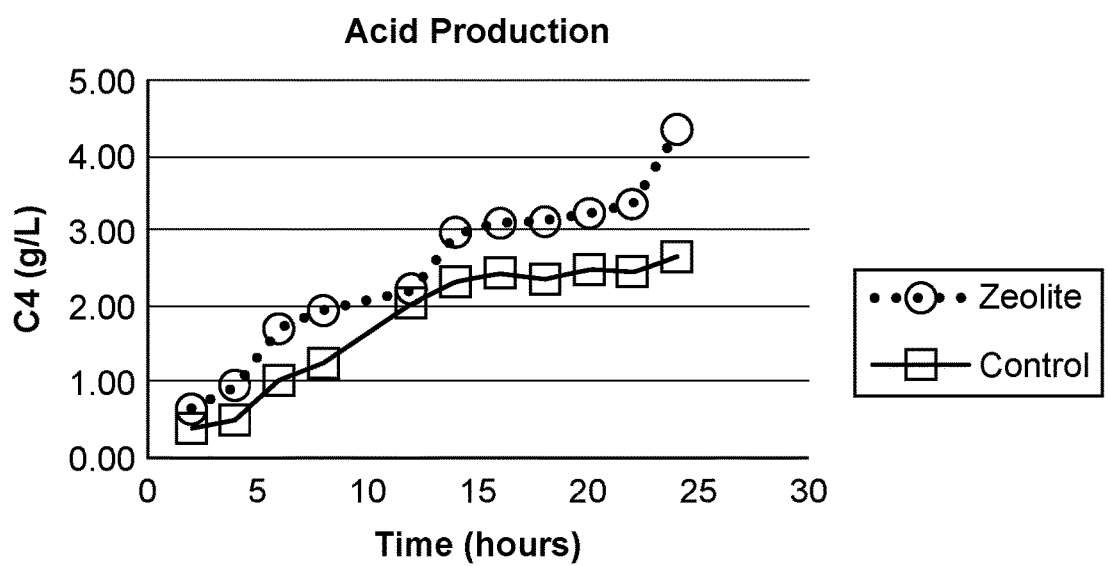
FIG. 8 illustrates acid produced by microorganisms loaded onto zeolite and microorganisms in a liquid culture.
Figure 9:
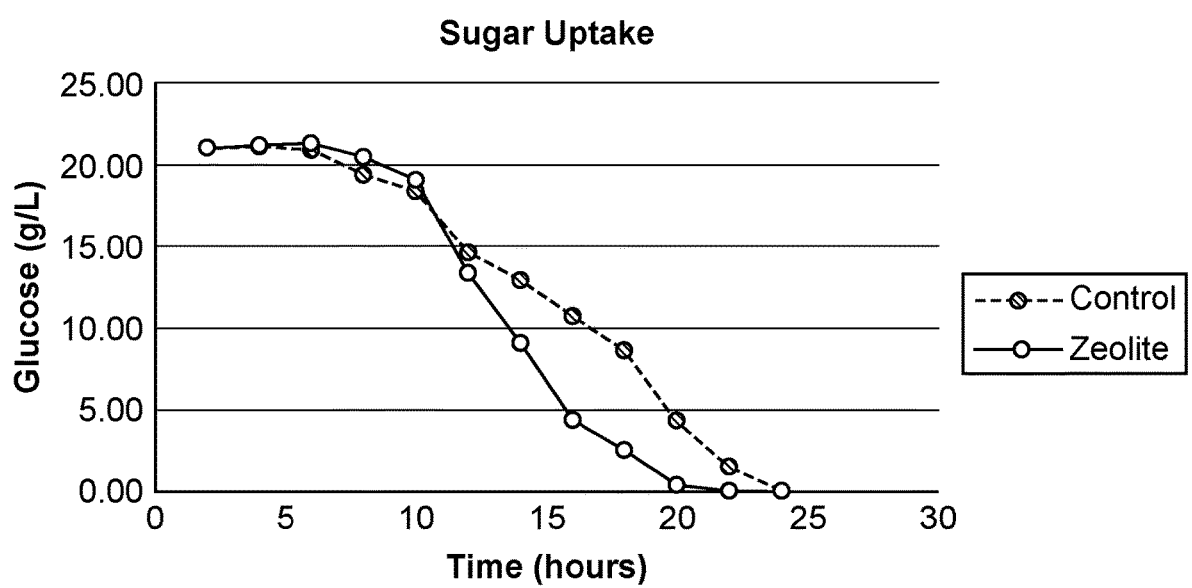
FIG. 9 illustrates sugar uptake by microorganisms loaded onto zeolite and microorganisms in a liquid culture.

A series of experiments utilizing zeolite as the inorganic porous medium was analyzed for microbial growth and substrate uptake. The zeolite used was Clinoptilolite, Natural Zeolite, CAS number 12173-10-3. The control was a liquid based mixed microbial culture. The zeolite was loaded with the exact quantities of the mixed cultures. FIG. 7 shows the total mass of gas produced for the liquid control and for the microorganisms loaded onto zeolite. The zeolite containing culture shows an increase in total mass of gas produced compared to the control. FIG. 8 shows the acid production for both the control and zeolite containing culture. The zeolite containing culture shows an increase in acid produced compared to the control. FIG. 9 shows the sugar uptake for both the control and the zeolite containing culture. The zeolite containing culture shows an increase in sugar uptake compared to the control.

What is claimed is:

1. A method of continuously producing fertilizer or compost comprising:
   a) providing a microbial solution comprising at least one microbial species loaded onto or within an inorganic porous medium;
   b) providing a reaction vessel comprising an influent stream, an effluent stream, an aqueous phase, and a biosolids phase, wherein the biosolids phase comprises at least one nutrient source for the at least one microbial species;
   c) adding the microbial solution comprising the at least one microbial species loaded onto or within the inorganic porous medium to the reaction vessel;

d) continuously separating the effluent stream into a treated aqueous phase and a treated biosolids phase; and e) dewatering the treated biosolids phase to produce the fertilizer or compost; wherein the inorganic porous medium is physically modified to permit sorption of nitrogen and/or phosphorous from the aqueous phase to (i) increase a nutrient concentration of the fertilizer or compost and (ii) decrease the amount of nitrogen and/or phosphorous in the aqueous phase, and wherein physically modifying the inorganic porous medium comprises roughening a surface of the inorganic porous medium or increasing porosity of the inorganic porous medium.

2. The method of claim 1, wherein the inorganic porous medium comprises silica, zeolite, aluminosilicate, silicate, diatomaceous earth, or any combination thereof.

3. The method of claim 1, wherein the at least one microbial species is aerobic.

4. The method of claim 1, wherein the at least one microbial species is anaerobic.

5. The method of claim 1, further comprising adding a flocculation agent to the effluent stream.

6. The method of claim 1, further comprising operating the reaction vessel in a stationary phase such that a number of the at least one microbial species produced is equal to a number of microbial species consumed and an overall population of the at least one microbial species remains unchanged.

7. The method of claim 1, further comprising returning at least a portion of the biosolids phase to the reaction vessel.

8. The method of claim 1, wherein a yield of treated biosolids phase is less than about 40%, wherein the yield is measured as a unit mass of waste produced per unit mass of organic loading.

9. The method of claim 1, wherein the nutrient source comprises biomass or dead cells.

10. The method of claim 1, wherein the microbial solution is loaded within the inorganic porous medium to produce a substance that is dry-to-the-touch.

11. The method of claim 1, further comprising operating the reaction vessel in an endogenous decay phase such that an overall population of the at least one microbial species is reduced.

12. The method of claim 1, wherein physically modifying the inorganic porous medium comprises using a coagulation or flocculation agent to induce formation of aggregates or agglomerates.

13. The method of claim 1, further comprising operating the reaction vessel for a solids retention time of greater than twenty days.

14. A method of continuously producing fertilizer or compost comprising:

a) providing a microbial solution comprising at least one microbial species loaded onto or within an inorganic porous medium;

b) providing a reaction vessel comprising an influent stream, an effluent stream, an aqueous phase, and a biosolids phase, wherein the biosolids phase comprises at least one nutrient source for the at least one microbial species;

c) adding the microbial solution comprising the at least one microbial species loaded onto or within the inorganic porous medium to the reaction vessel;

d) continuously separating the effluent stream into a treated aqueous phase and a treated biosolids phase; and e) dewatering the treated biosolids phase to produce the fertilizer or compost, wherein the inorganic porous medium is chemically modified by adding a chelating agent and/or a salt to the inorganic porous medium to lead to precipitation of compounds that preferentially bind ammonia and phosphorous.

15. The method of claim 14, wherein the salt comprises a magnesium salt.

16. The method of claim 14, wherein the at least one microbial species is aerobic.

17. The method of claim 14, wherein the at least one microbial species is anaerobic.

18. The method of claim 14, further comprising adding a flocculation agent to the effluent stream.

19. The method of claim 14, further comprising operating the reaction vessel in a stationary phase such that a number of the at least one microbial species produced is equal to a number of microbial species consumed and an overall population of the at least one microbial species remains unchanged.

20. The method of claim 14, further comprising operating the reaction vessel in an endogenous decay phase such that an overall population of the at least one microbial species is reduced.

* * * * *